US008582861B2

(12) United States Patent
Hasslmeyer et al.

(10) Patent No.: US 8,582,861 B2
(45) Date of Patent: Nov. 12, 2013

(54) METHOD AND APPARATUS FOR SEGMENTING BIOLOGICAL CELLS IN A PICTURE

(75) Inventors: Erik Hasslmeyer, Nuremberg (DE); Matthias Elter, Erlangen (DE); Thorsten Zerfass, Nuremberg (DE); Timo Schlarb, Fuerth (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 196 days.

(21) Appl. No.: 13/167,471

(22) Filed: Jun. 23, 2011

(65) Prior Publication Data

US 2011/0317903 A1  Dec. 29, 2011

(30) Foreign Application Priority Data

Jun. 24, 2010  (DE) .......................... 10 2010 024 859

(51) Int. Cl.
*G06K 9/00*  (2006.01)
*G01N 33/20*  (2006.01)
*G01N 33/554*  (2006.01)

(52) U.S. Cl.
USPC .............................. 382/133; 436/74; 436/519

(58) Field of Classification Search
USPC .......... 382/128, 129, 130, 131, 132, 133.134, 382/164, 171, 173, 179; 436/63, 519, 74, 436/520, 521; 600/36, 322, 356, 368, 381; 604/522, 369, 403; 324/434, 450; 435/2, 70.4; 424/1.17, 529
See application file for complete search history.

(56) References Cited

U.S. PATENT DOCUMENTS 4,097,845 A * 6/1978 Bacus ........................... 382/134
8,300,938 B2 * 10/2012 Can et al. ...................... 382/173

OTHER PUBLICATIONS

Gonzalez, R. C. und R. E. Woods: Digital Image Processing (3rd Edition). Prentice-Hall, Inc., Upper Saddle River, NJ, USA, 2006.
Lehmann, T., W. Oberschelp, E. Pelikan und R. Repges: Bildverarbeitung fur die Medizin. Springer-Verlag, 1997; English Translation included.
Dr Zenzo, S.: A note on the gradient of a multi-image. *Comput. Vision Graph. Image Process.*, 33(1):116-125, 1986.

(Continued)

*Primary Examiner* — Abolfazl Tabatabai
(74) *Attorney, Agent, or Firm* — Michael A. Glenn; Perkins Coie LLP

(57) ABSTRACT

A method of segmenting biological cells in a picture so that the biological cells represent a foreground of the picture includes a step of applying a first fast marching algorithm to the picture or to a pre-processed version of same in order to obtain a first fast marching image. In addition, the method includes a step of segmenting the first fast marching image or a further-processed version of same into a plurality of homogeneous regions. Furthermore, the method includes a step of mapping each of the homogeneous regions to one node of a graph, respectively. In addition, the method includes a step of classifying each homogeneous region either as background or foreground on the basis of the graph. Moreover, the method includes a step of applying a second fast marching algorithm within the homogeneous regions classified as foreground so as to segment the foreground into individual biological cells.

16 Claims, 12 Drawing Sheets

(56) References Cited

OTHER PUBLICATIONS

Hengen, H., S. L. Spoor und M. C. Pandit: Analysis of blood and bone marrow smears using digital image processing techniques. In: *M SoNKA & J. M. Fitzpatrick (Hrsg.): Society of Photo-Optical Instrumentation Engineers (SPIE) Conference Series,* Bd. 4684 d. Reihe Presented at the Society of Photo Optical Instrumentation Engineers (SPIE) Conference, S. 624-635, May 2002.

Jianhua, W, Z. Lr, L. Yangbin und Z. Pingping: Image Segmentation Method based on Lifting Wavelet and Watershed Arithmetic. In: *Electronic Measurement and Instruments,* 2007. !GEM! '07. 8th International Conference on, S. 2-978-2-981, Jul. 16-18, 2007.

Montseny, E., P. Sobrevilla und S. Romani: A fuzzy approach to white blood cells segmentation in calor bone marrow images. In: *Fuzzy Systems,* 2004. Proceedings. 2004 IEEE International Conference on, Bd. 1, S. 173-178 vol. 1, Jul. 2004.

Nilsson, B. und A. Heyden: Model-based Segmentation of Leukocytes Clusters. In: *ICPR '02: Proceedings of the 16th International Conference on Pattern Recognition (ICPR '02)* vol. 1, S. 10727, Washington, DC, USA, 2002. IEEE Computer Society.

Nilsson, B. und A. Heyden: Segmentation of complex cell clusters in microscopic images: application to bone marrow samples. *Cytometry,* 66(I):24-31, 2005.

Otsu, N: A threshold selection method from gray level histograms. *IEEE Trans. Systems, Man and Cybernetics,* 9:62-66, 1979.

Park, J. und J. Keller: Snakes on the Watershed. *IEEE Transactions on Pattern Analysis and Machine Intelligence,* 23(10): 1201-1205, 2001.

Park, J-S. und J. Keller: Fuzzy patch label relaxation in bone marrow cell segmentation. In: *Systems, Man, and Cybernetics,* 1997. 'Computational Cybernetics and Simulation'., 1997 IEEE International Conference on Bd, 2, S. 1133-1138 vol. 2, Oct. 1997.

Priese, L. und P. Sturm: *Introduction to the Calor Structure Code and its Implementation,* 2003.

Aldo v. Wangenheim, et al.: "Fast Two-Step Segmentation of Natural Color Scenes using Hierarchical Region-Growing and a Calor-Gradient Network"; Springer Verlag; 2009; *Journal of the Brazilian Computer Society.* Bd. 14. Nr. 4. S. 29-40.

Sophie SchOpp, Abderrahim Elmoataz, Mohamed-Jalal Fadili and Daniel Bloyet: "Fast statistical level sets image segmentation for biomedical applications"; *Springer-Verlag and IEEE/CS, 2001; Scale-Space 2001, LNCS 2106,* pp. 380-388, 2001.

\* cited by examiner

METHOD AND APPARATUS FOR SEGMENTING BIOLOGICAL CELLS IN A PICTURE

CROSS-REFERENCE TO RELATED APPLICATIONS

This application claims priority to German Patent Application No. 102010024859.2 filed 24 Jun. 2010, which is incorporated herein by reference.

Embodiments of the present invention relate to a method and an apparatus for segmenting biological cells in a picture, as may be used, for example, for detecting and segmenting leukocytes in blood smears or bone marrow smears.

BACKGROUND OF THE INVENTION

One important component of hematology is the differential blood count. Systems from the field of "computer-assisted microscopy" (CAM) enable automatic analysis of blood smears and support hematologists in classifying cells, and thus they form a supplement for modern hematological laboratory diagnostics. It is in a fast, precise and highly efficient manner that modern hematology systems provide important information about the cell population of peripheral blood. However, up to 40% of samples may subsequently be manually differentiated under the microscope in clinics and laboratories. Specifically this last step may be accelerated and objectified by means of a system of "computer-assisted microscopy", as is shown in FIG. 11. This leads to both reducing the amount of work involved and increasing the quality of the results. On the basis of innovative concepts of image processing, leukocytes in the blood smear are localized and classified into clinically relevant subclasses. Reference data sets which are classified in advance by experts and may be extended any time serve as the basis for said classification.

A typically CAM system (as is shown by way of example of a system for creating a differential blood count in FIG. 11) typically consists of the following core modules: detection of the cells, segmentation of the cells, and classification of the cells.

In particular in bone marrow smears, cells (typically white blood corpuscles—leukocytes) are mostly exist in the form of cell clusters (cell groups), i.e. the individual cells are directly adjacent to one another and are therefore difficult to segment, which complicates exact differentiation. Several methods addressing segmentation of leukocytes in bone marrow smears have been known from the literature. The majority of methods are based on the watershed algorithm. The documents LEHMANN; T., W. OBERSCHELP; E. PELIKAN and R. REPGES: *Bildverarbeitung für die Medizin*, Springer-Verlag, 1997, GONZALES, R. C., and R. E. WOODS: *Digital Image Processing* (3$^{rd}$ Edition), Prentice-Hall, Inc., Upper Saddle River, N.J., USA, 2006, show an application of this watershed algorithm in digital image processing. The most widely used methods of segmenting leukocytes in bone marrow smears will be mentioned below.

The documents NILSSON, B, and A. HEYDEN: Model-based Segmentation of Leukocytes Clusters. In: *ICPR '02: Proceedings of the 16$^{th}$ International Conference on Pattern Recognition (ICPR, 02*, Volume 1, page 10,727, Washington, D.C., USA, 2002. IEEE Computer Society, and NILSSON, B., and A. HEYDEN: *Segmentation of complex cell clusters in microscopic images: application to bone marrow samples*. Cytometry, 66(1): 24-31, 2005, show a method of segmenting complex cell clusters in microscopic images. By means of this method, the cell clusters are initially separated from the background by a threshold-value method. In order to separate leukocytes within a cluster, the background segmentation is subjected to weighted distance transformation, and the result is subdivided into regions by means of the watershed algorithm. Since the watershed step results in over-segmentation, adjacent regions are merged on the basis of such features as "roundness", "surface area" etc. The result is the segmentation of cells.

The document PARK, J., and J. KELLER: *Snakes on the Watershed*. IEEE Transactions on Pattern Analysis and Machine Intelligence, 23(10): 1,201-1,205, 2001, shows a so-called snakes-on-the-watershed method. As in the preceding method, distance transformation is applied to background segmentation. The output of the subsequent watershed algorithm is used for initializing the "snake" zones of the "snake" algorithm. By means of the "snake" algorithm, the contour of each leukocyte is then determined.

In the method of the document PARK, J.-S., and J. KELLER: *Fuzzy patch label relaxation in bone marrow cell segmentation, in: Systems, Man, and Cybernetics.* 1997. *'Computational Cybernetics and Simulation'*, 1997 IEEE International Conference on, Volume 2, pages 1,133-1,138, Volume 2, October 1997, the watershed algorithm is applied directly to the input image. By means of stochastic methods, the resulting regions are associated with the four classes of background, red blood corpuscles (erythrocytes), cytoplasm and cell nucleus.

In the method of the document JIANHUA, W., Z. LI, L. YANGBIN and Z. PINGPING: *Image Segmentation Method based on Lifting Wavelet and Watershed Arithmetic*, in: *Electronic Measurement and Instruments*, 2007. ICEMI '07. 8th International Conference on, pages 2-978-2-981, 16., 18. July 2007, 2007, images having lower resolutions are generated from the input image by means of so-called wavelets (which developed when wavelet transformation was employed). Said images are then segmented with the aid of the watershed algorithm. The segmentations calculated at the different stages of resolution are combined to obtain a high-quality segmentation result of the original image.

In the following, mention shall also be made of two further methods not based on the above-mentioned watershed algorithm. The document HENGEN, H., S. L. SPOOR and M. C. PANDIT: *Analysis of blood and bone marrow smears using digital image processing techniques*, in: M. SONKA & J. M. FITZPATRICK (Eds.): *Society of Photo-Optical Instrumentation Engineers (SPIE) Conference Series*, Volume 4.684 of the series *Presented at the Society of Photo-Optical Instrumentation Engineers (SPIE) Conference*, pages 624-635, May 2002, shows a method wherein segmentation is performed in that a distance transformation is calculated on the basis of a background estimation. By means of a threshold value, regions are then generated on the distance image, said regions representing the midpoints of the cells, for example. Said regions are then used for initializing a "region growing" algorithm so as to find the boundaries of the cells.

The document MONTSENY, E., P. SOBREVILLA and S. ROMANI: *A fuzzy approach to white blood cells segmentation in color bone marrow images*, in: *Fuzzy Systems*, 2004. Proceedings. 2004 IEEE International Conference on, Volume 1, pages 173-178, Volume 1, July 2004, shows a method wherein each pixel is associated with one of 53 color patterns. With the aid of stochastic methods, each color pattern has one of three classes assigned to it, and thus classification of each pixel is achieved. The three classes are called region of interest, undefined region, and region not of interest.

All of the methods introduced herein have the disadvantage that reliable segmentation of cells that are present in cell clusters is not effected or is effected only insufficiently. In particular methods based on the watershed algorithm tend to subdivide one cell into several individual regions, i.e. a cell is over-segmented.

SUMMARY

According to an embodiment, a method of segmenting biological cells in a picture so that the biological cells represent a foreground of the picture may have the steps of applying a first fast marching algorithm to the picture or to a pre-processed version of same so as to achieve a first fast marching image, the first fast marching algorithm starting from a background of the picture, and a velocity function of the first fast marching algorithm being based on a first edge-strength image of the picture; segmenting the first fast marching image or a further-processed version of same into a plurality of homogeneous regions; mapping each of the homogeneous regions to one node, respectively, of a graph so that nodes of adjacent homogeneous regions are connected to one another and so that the graph has roots which correspond to homogeneous regions located at cell centers; classifying, on the basis of the graph, each homogeneous region either as background or as foreground; and applying a second fast marching algorithm within the homogeneous regions classified as foreground to a second edge-strength image so as to segment the foreground into individual biological cells, the second fast marching algorithm starting from those homogeneous regions which correspond to the roots of the graph.

According to another embodiment, an apparatus for segmenting biological cells in a picture so that the biological cells represent a foreground of the picture may have: a fast marching processor configured to apply a first fast marching algorithm to a picture or a pre-processed version of same so as to achieve a first fast marching image, the first fast marching algorithm starting from a background of the picture, and a velocity function of the first fast marching algorithm being based on a first edge-strength image of the picture; a segmenter configured to segment the first fast marching image or a further-processed version of same into a plurality of homogeneous regions; a mapper configured to map each of the homogeneous regions to one node, respectively, of a graph so that nodes of adjacent homogeneous regions are interconnected and that the graph has roots which correspond to homogeneous regions located at cell centers; and a classifier configured to classify each homogeneous region either as background or as foreground on the basis of the graph; said fast marching processor being further configured to apply a second fast marching algorithm within the homogeneous regions classified as foreground to a second edge-strength image so as to segment the foreground into, individual biological cells, said fast marching processor being configured such that said second fast marching algorithm starts from those homogeneous regions that correspond to the roots of the graph.

Another embodiment may have a computer program including a program code for performing the method of segmenting biological cells in a picture, so that the biological cells represent a foreground of the picture, which method may have the steps of applying a first fast marching algorithm to the picture or to a pre-processed version of same so as to achieve a first fast marching image, the first fast marching algorithm starting from a background of the picture, and a velocity function of the first fast marching algorithm being based on a first edge-strength image of the picture; segmenting the first fast marching image or a further-processed version of same into a plurality of homogeneous regions; mapping each of the homogeneous regions to one node, respectively, of a graph so that nodes of adjacent homogeneous regions are connected to one another and so that the graph has roots which correspond to homogeneous regions located at cell centers; classifying, on the basis of the graph, each homogeneous region either as background or as foreground; and applying a second fast marching algorithm within the homogeneous regions classified as foreground to a second edge-strength image so as to segment the foreground into individual biological cells, the second fast marching algorithm starting from those homogeneous regions which correspond to the roots of the graph, when the program runs on a computer.

Embodiments of the present invention provide a method of segmenting biological cells in a picture so that the biological cells represent a foreground of the picture, comprising a step of applying a first fast marching algorithm to the picture or to a pre-processed version of same in order to obtain a first fast marching image. The first fast marching algorithm starts from a background of the picture. A velocity function of the first fast marching algorithm is based on an edge-strength image of the picture.

In addition, the method comprises a step of segmenting the first fast marching image or a further-processed version of same into a plurality of homogeneous regions.

In this context, a homogeneous region may be contiguous in mathematical terms and may therefore also be referred to as a contiguous homogeneous region.

Furthermore, the method comprises a step of mapping each of the homogeneous regions to one node of a graph, respectively. Said mapping is effected such that nodes of adjacent homogeneous regions are interconnected and that the graph comprises roots which correspond to homogeneous regions located at cell centers.

In addition, the method comprises a step of classifying each homogeneous region either as background or foreground on the basis of the graph.

Moreover, the method comprises a step of applying a second fast marching algorithm. The second fast marching algorithm is applied, within the homogeneous regions classified as foreground, to a second edge-strength image so as to segment the foreground into individual biological cells. The second fast marching algorithm starts from the homogeneous regions corresponding to the roots of the graph.

It is a core idea of the present invention that improved segmentation of cells in a picture may be achieved when, on the basis of an edge-strength image of the picture, a first fast marching image is produced which is segmented into a plurality of homogeneous regions so as to subdivide said homogeneous regions into foreground and background on the basis of a graph, and when a second fast marching algorithm is applied within the homogeneous regions classified as foreground so as to segment the foreground into individual biological cells.

One advantage of embodiments of the present invention is that the biological cells present in the picture may be amplified by applying the first fast marching algorithm to obtain the first fast marching image. This enables easier segmentation of the first fast marching image or of the further-processed version of same into the plurality of homogeneous regions as compared to an image wherein the first fast marching algorithm was not applied.

A further advantage of embodiments of the present invention is that simple and unambiguous decision criteria may be formed by mapping the homogeneous regions to nodes of a graph. Said decision criteria may be applied in a simple manner in the step of classifying the homogeneous regions as background or foreground.

A further advantage of embodiments of the present invention is that classifying the homogeneous regions as background or foreground enables that the second fast marching algorithm can only be applied within the homogeneous regions classified as foreground. Thus, both the computing expenditure and the computing time involved are reduced for the second fast marching algorithm.

Therefore, embodiments of the present invention provide a method which enables improved segmentation of biological cells in a picture as compared to the methods cited in the introductory part of this application.

In accordance with some embodiments of the present invention, the velocity function of the first fast marching algorithm may further be based on a distance function indicating, for each pixel of the picture, a distance of a color value of the respective pixel from a cell estimation color value associated with the respective pixel. For example, said cell estimation color value may be an estimated foreground color of that leukocyte which is closest with regard to the pixel.

By using this distance function as the second parameter of the velocity function of the first fast marching algorithm, color information of the picture may also be used in addition to edge information (which is used in the edge-strength image of the picture) in order to obtain an improved fast marching image. Utilization of the distance function and of the edge-strength image as parameters for the velocity function enables, for example, that the velocity function is slow in an area of an edge (for example an edge between the cell and the background), and is fast in an area of a large distance between the color value and the cell estimation color value (for example in the background). This enables, for example, that the first fast marching algorithm firstly processes the background of the picture and lastly processes the cell nuclei (for example when the cell estimation color value is a color value of a cell nucleus or at least of a cell). On the basis of the points in time at which the respective pixels of the picture are processed by the first fast marching algorithm, i.e. of the so-called arrival time of the fast marching front, the first fast marching image may be formed, for example as a gray-level image.

In accordance with further embodiments of the present invention, the second fast marching algorithm may be configured such that a meeting line between a first fast marching front, which starts from a first cell center of a first biological cell, and a second fast marching front, which starts from a second cell center of a second biological cell, forms a boundary between the first biological cell and the second biological cell. By forming boundaries between different cells on the basis of meeting lines of fast marching fronts of the second fast marching algorithm, over-segmentation of cells, as it may be the case, for example, in the above-mentioned watershed algorithm, can be (almost) ruled out. In addition, the formation of boundaries between the cells on the basis of meeting lines between the fast marching fronts enables a termination criterion for the fast marching algorithm, for example such that a fast marching front which meets another fast marching front will no longer propagate at this meeting line. This enables time-efficient implementation of the second fast marching algorithm.

In accordance with some embodiments, the second edge-strength image used in the step of applying the second fast marching algorithm may be the same as the first edge-strength image, whereby computing expenditure of the method may be significantly reduced.

BRIEF DESCRIPTION OF THE DRAWINGS

Embodiments of the present invention will be detailed subsequently referring to the appended drawings, in which:

FIG. 9a shows the input image of FIG. 3a;

DETAILED DESCRIPTION OF THE INVENTION

Figure 1:
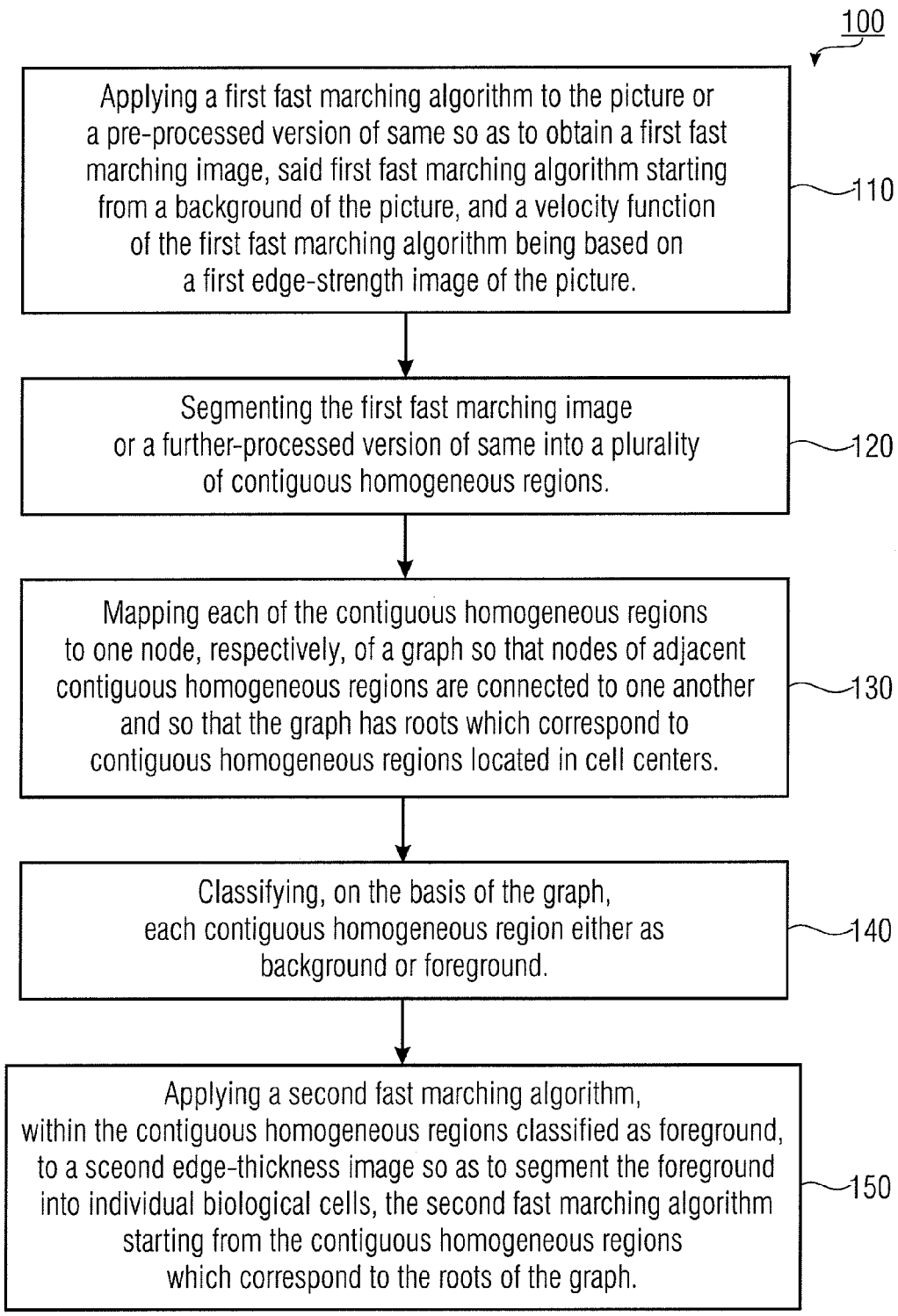
FIG. 1 shows a flowchart of a method in accordance with an embodiment of the present invention.

Before embodiments of the present invention will be explained in more detail below with reference to the accompanying figures, it shall be noted that elements that are identical or identical in function will be designated by the same reference numerals, and that repeated description of said elements will be dispensed with. Therefore, descriptions of elements having identical reference numerals are interchangeable.

FIG. 1 shows a flowchart of a method 100 of segmenting biological cells in a picture, so that the biological cells represent a foreground of the picture, in accordance with an embodiment of the present invention. A biological cell may be a white blood corpuscle (leukocyte), a red blood corpuscle (erythrocyte) or any other biological cell. For example, the picture may comprise a plurality of biological cells of different cell types. The cells may be present in so-called cell clusters (cell groups), for example. The picture may be an RGB (red/green/blue) image, a CMY (cyan/magenta/yellow) image, an HSI (hue/saturation/intensity) image, or a gray-level image. An RGB image may, for example, have a depth of 8 bits per channel and pixel (also referred to as an image point, for example). The picture may be present on a digital storage device, for example, or may be taken in a separate step of the method.

The method 100 comprises a step 110 of applying a first fast marching algorithm to the picture or to a pre-processed version of same in order to obtain a first fast marching image. The first fast marching algorithm starts from a background of the picture. A velocity function of the first fast marching algorithm is based on an edge-strength image of the picture. The edge-strength image of the picture may be created, e.g., in a previous step or may already be present on a storage medium and be made available to the method.

In addition, the method 100 comprises a step 120 segmenting the first fast marching image or a further-processed version of same into a plurality of homogeneous regions. The further-processed version of the fast marching image may be created, e.g., by smoothing the fast marching image in a further step of the method, for example by applying a low-pass filter to the first fast marching image. This enables filtering out artefacts that have developed in step 110. For example, a homogeneous region may be characterized in that pixels of the fast marching image which are associated with a common homogeneous region exhibit similar color values in a predefined area. A color value of a homogeneous region may be a mean value of color values of pixels of the homogeneous region, for example.

In the following, a homogeneous region may also be referred to as a region for short.

A color value of a pixel, or a sample of a homogeneous region, may also be referred to as a sample of the pixel or a sample of the homogeneous region in the following. For example, a sample may describe a strength of the individual color channels or of a gray channel of the pixel or of the homogeneous region, or a brightness of the pixel or of the homogeneous region.

In the first fast marching image, a biological cell may be represented by a plurality of homogeneous regions. For example, a cell nucleus of a biological cell may be represented by one homogeneous region, and a cytoplasm of the cell may be represented by one or more homogeneous regions. Color values of homogeneous regions representing a cell may decrease from the inside (from the cell nucleus) toward the outside (toward the edge of the cytoplasm). Since color gradients of biological cells are typically similar, different biological cells of the same type may typically have a similar number of homogeneous regions.

In addition, the method 100 comprises a step 130 of mapping each of the homogeneous regions to one node of a graph, respectively, such that nodes of adjacent homogeneous regions are interconnected and that the graph comprises roots which correspond to homogeneous regions located at cell centers.

A cell center of a biological cell may also be referred to as a cell midpoint and may be a cell nucleus of the biological a cell, for example. A root of the graph may be defined, e.g., as a homogeneous region which is not adjacent to any homogeneous region whose color value is higher (brighter) than its own. A leaf of the graph may be defined, e.g., as a homogeneous region which is not adjacent to any homogeneous region whose color value is smaller (darker) than its own. In other words, roots of the graph may form local maxima, and leaves of the graph may form local minima, for example with regard to the color values of the homogeneous regions.

In addition, the method 100 comprises a step 140 of classifying, on the basis of the graph, each homogeneous region either as background or foreground.

Classification of a homogeneous region as background or foreground may be effected, for example, on the basis of a position of a node—to which the homogeneous region was mapped—within the graph. On the basis of the position of the node within the graph in connection with a decision criterion, one may then determine for each homogeneous region whether same is classified as foreground or background. Any homogeneous regions classified as background may be combined and may yield final background segmentation. The remainder of the homogeneous regions may be combined as the foreground.

Moreover, the method 100 comprises a step 150 applying a second fast marching algorithm. The second fast marching algorithm is applied, within the homogeneous regions classified as foreground, to a second edge-strength image so as to segment the foreground into individual biological cells. The second fast marching algorithm starts from the homogeneous regions corresponding to the roots of the graph. In other words, the second fast marching algorithm starts from the homogeneous regions that are located at cell centers. In this context, the second fast marching algorithm may start in parallel from any homogeneous region located in a cell center, so that several fast marching fronts will simultaneously propagate within the homogeneous regions classified as foreground. Since the second fast marching algorithm is applied only within the homogeneous regions classified as foreground, a velocity function of the second fast marching algorithm within the homogeneous regions classified as background may be zero. An output of the second fast marching algorithm, i.e. a second fast marching image, for example, thus is also an output of the method 100. Thus, in this second fast marching image, the foreground is separate from the background, and, in particular, the biological cells are segmented, i.e. separated from one another. The mutually segmented cells may now be classified in a further step.

Figure 2:
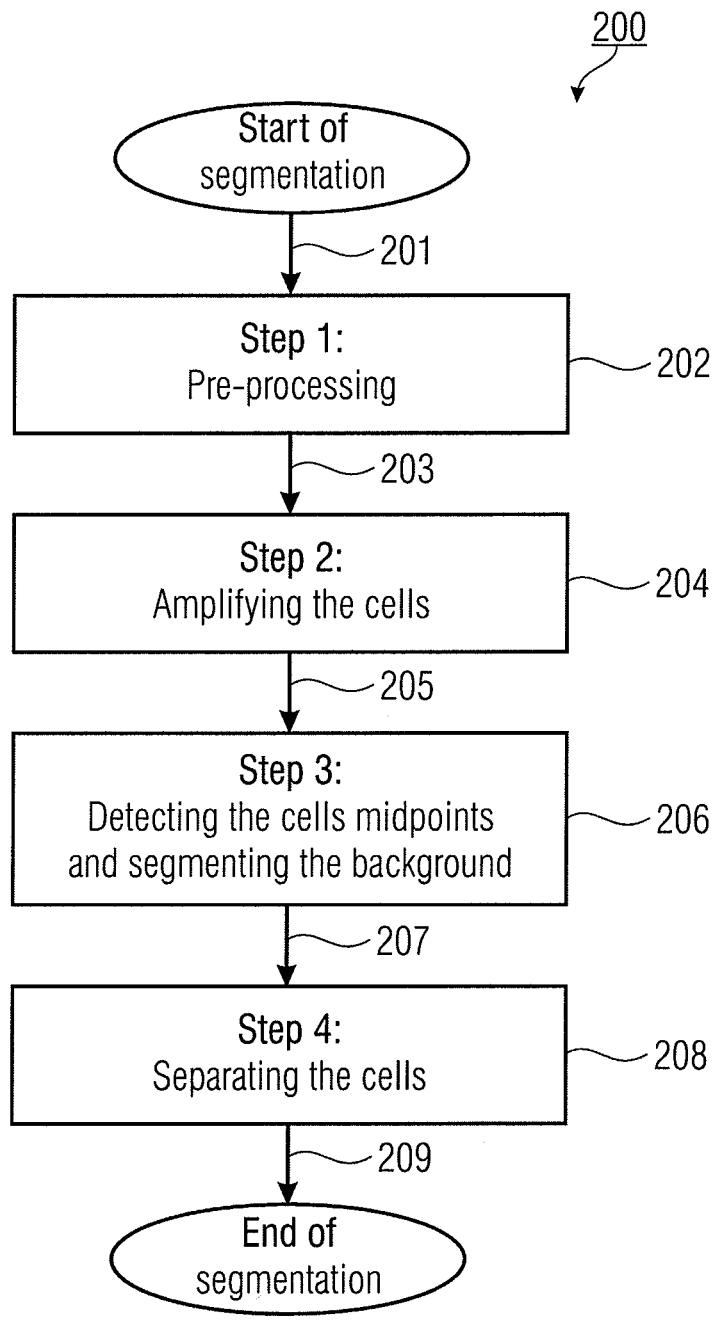
FIG. 2 shows a flowchart of a method in accordance with a further embodiment of the present invention.

FIG. 2 shows a flowchart of a method 200 of segmenting biological cells in a picture, so that the biological cells represent a foreground of the picture, in accordance with a further embodiment of the present invention. The method 200 represents a more detailed version of the method 100 as was described above. The method 200 is described by way of example of segmentation of white blood cells (leukocytes) within bone marrow smears. Even though the method is utilized in connection with segmentation of leukocytes in bone marrow smears, this method 200—just like the method 100, which is an abstract version of the method 200—may also be utilized for segmenting any other biological cells in pictures (e.g. images, photos or the like).

The flowchart in FIG. 2 shows the approximate course of the (segmentation) method 200.

Figure 3A:
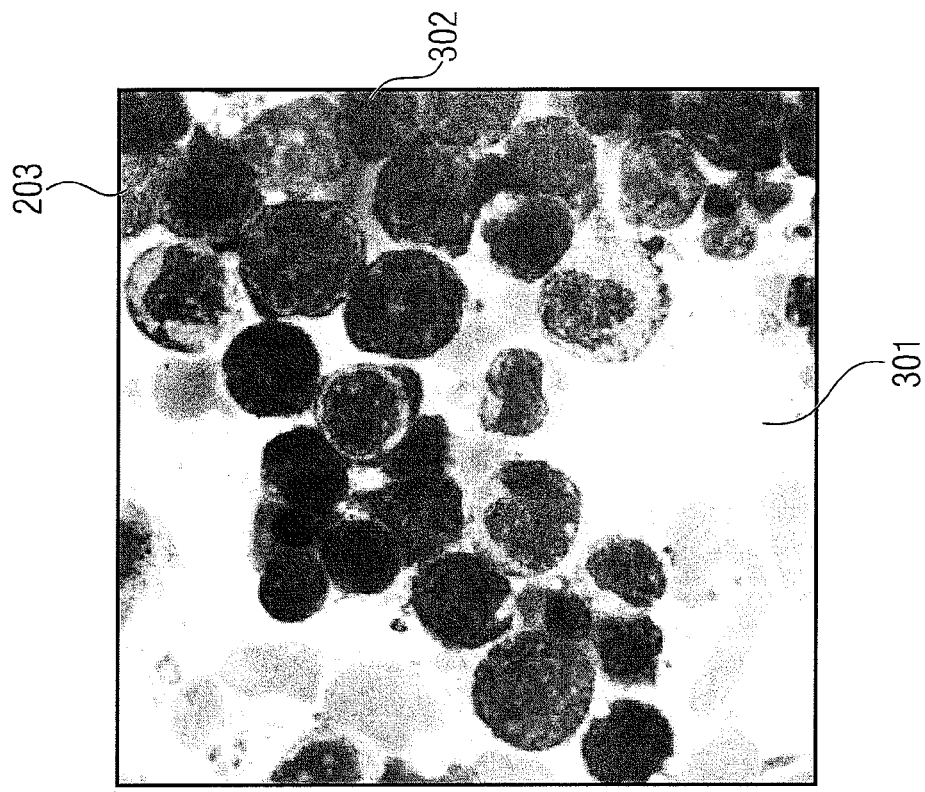
FIG. 3a shows an exemplary original image as may be used as an input for the method in accordance with FIG. 2.

An original image 201 (which may also be referred to as a picture), as is shown in FIG. 3a for example, serves as an input for the method 200. A first step 202 of pre-processing the original image 201 of the method 200 comprises pre-processing the original image 201, for example to eliminate disturbances in the original image 201. An output of the pre-processing step 202 is, e.g., a pre-processed version 203 (which was already mentioned above) of the original image 201. The pre-processed version 203 of the original image 201 may be seen in FIG. 3b.

A second step 204 of amplifying the cells of the method 200 comprises processing the pre-processed version 203 of the original image 201 such that the cells present in the original image 201 become more prominent. An output of the step 204 is a first fast marching image 205 (which was already mentioned above), for example.

A third step 206 of detecting the cell midpoints and of segmenting the background comprises segmenting the first fast marching image 205 into cell midpoints, foreground and background. An output of the third step 206 may be a graph 207 (which was already mentioned above) of nodes.

A fourth step 208 of separating the cells of the method 200 comprises separating—on the basis of the graph 207—the individual biological cells that are present in the original image 201. An output of the fourth step 208 is an output image 209 (which was already mentioned above), which is also an output image of the method 200 and wherein the individual biological cells are segmented, i.e. separated from one another. The output image 209 may be a list of foreground regions, for example, each foreground region representing precisely one cell.

The individual steps of the method 200 shall be described in detail below. It is to be noted that the second step 204 of the method 200 comprises several sub-steps shown in a flowchart in FIG. 4. In addition, it shall be noted that the third step 206 of the method 200 comprises several sub-steps shown in a flowchart in FIG. 6.

Figure 3B:
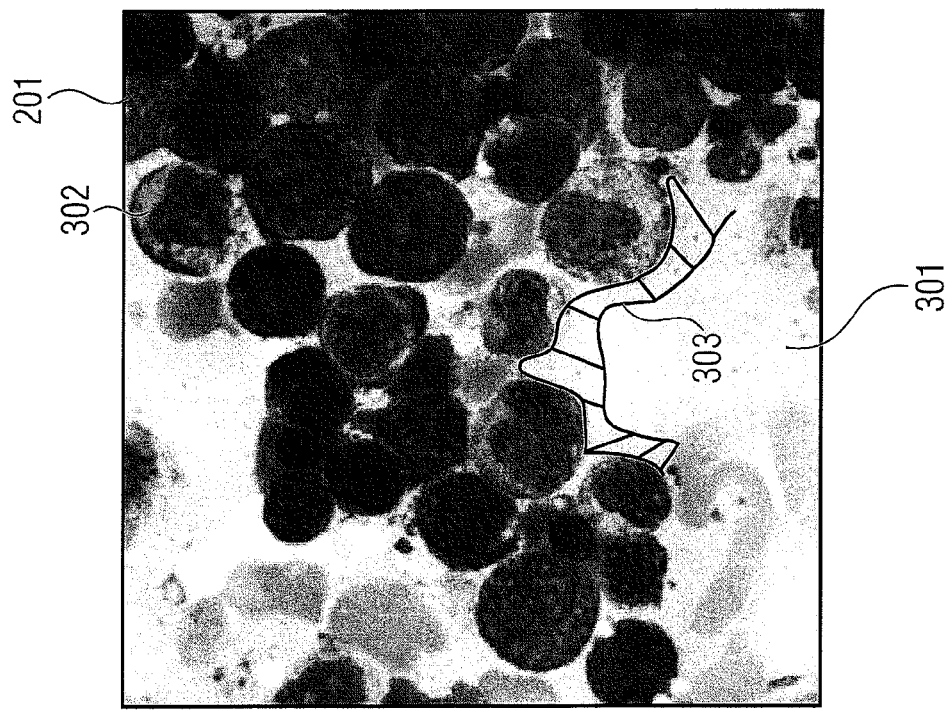
FIG. 3b shows the image of FIG. 3a once a pre-processing step of the method in accordance with FIG. 2 has been performed.

The first step 202 of pre-processing the method 200 serves to eliminate disturbances in the original image 201 (which may also be referred to as an input image or a picture). Disturbances may be, e.g., undesired color gradients in the background of the original image 201 which have developed due to non-uniform illumination or due to remainders of burst cells. FIG. 3a shows how the original image 201 serves as the basis for the method 200 of segmenting the biological cells in the original image 201. FIG. 3b shows the further-processed version 203 of the original image 201 following the pre-processing step 202. In FIGS. 3a and 3b, a background 301 of the original image 201 and of the further-processed version 203 of same is depicted to be bright, whereas cell components 302 are represented by dark areas. Comparing the original image 201 and the further-processed version 203 of same reveals that color gradients were calculated out from the background 301. An exemplary color gradient 303 in the original image 201 is hatched. Said color gradient 303 no longer exists in the further-processed version 203 of the original image 201 because of the pre-processing step 202.

The pre-processing step 202 is optional, i.e. in accordance with some embodiments the pre-processing step 202 may also be omitted, so that the step 204 of amplifying the cells onto the original image 201 is performed.

Figure 4:
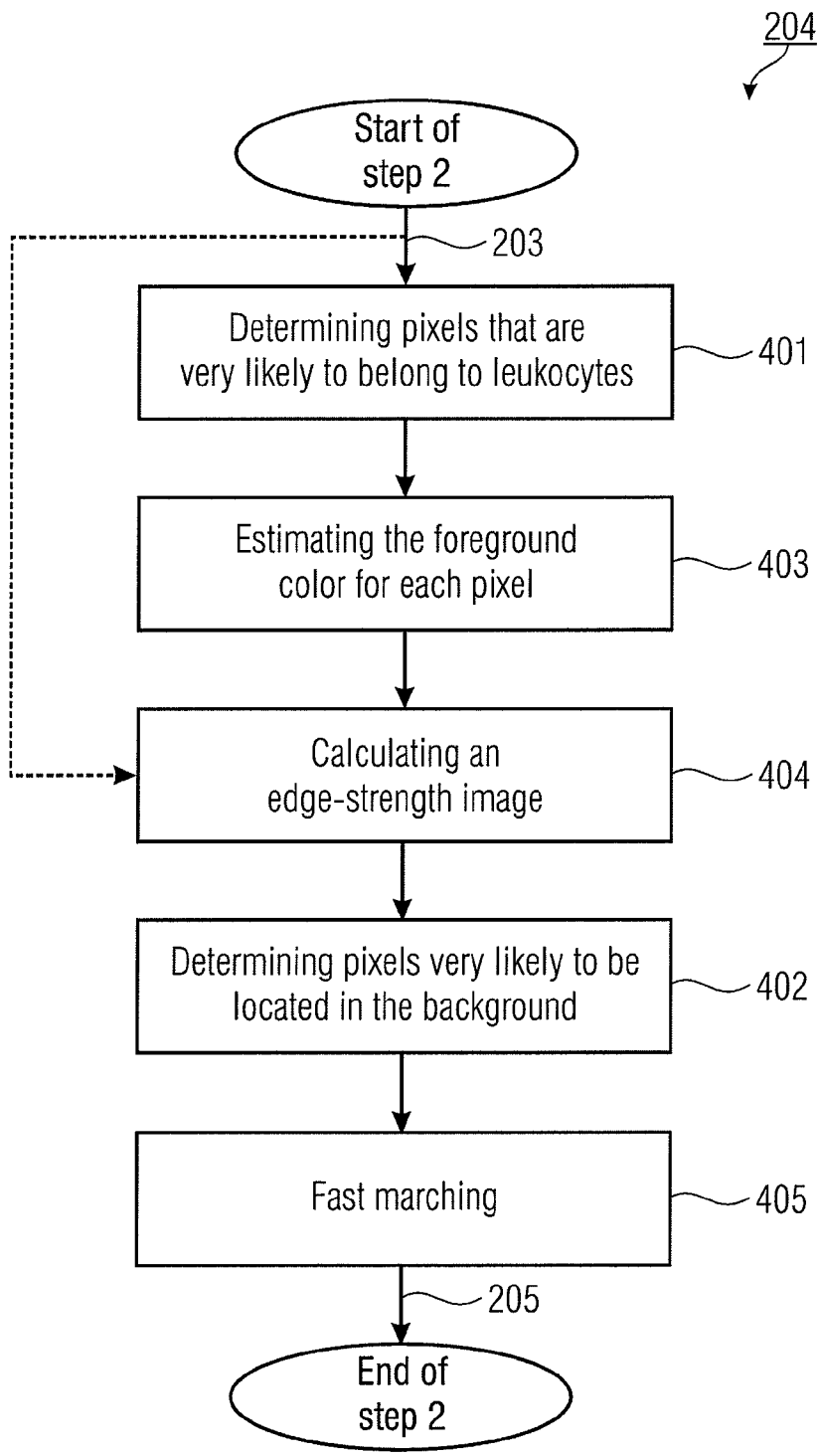
FIG. 4 shows a flowchart which depicts a partitioning of a second step of the method of FIG. 2 into sub-steps.

The step 204 of amplifying the cells comprises processing the original image 201 or the further-processed version 203 of same (which was formed by the pre-processing step 202) such that the cells (which are present in the original image 201) become more prominent. In this manner, segmentation of the leukocytes (for example in the step 206 of detecting the cell midpoints and of segmenting the background) may be achieved more easily later on. To gain a deeper understanding of the step 204 of amplifying the cells, the course of this step is shown in the flowchart in FIG. 4. In FIGS. 5a-5e, the individual sub-steps shown in the flowchart of FIG. 4 are illustrated by means of images.

It shall be assumed in the following that the pre-processed version 203 of the original image 201 is used as the input for the step 204.

A sub-step 401 of determining pixels that are very likely to belong to leukocytes, i.e. to the foreground of the original image 201, comprises determining the pixels of the pre-processed version 203 of the original image 201 which certainly belong to leukocytes, i.e. to the foreground of the original image 201.

In accordance with some embodiments, said pixels which are very likely to belong to leukocytes may be determined, for example, on the basis of a simple color threshold-value method. For example, a pixel may be determined as being very likely to belong to a leukocyte when a color value of said pixel exceeds a specific limiting value. A color value of a pixel may be based on red, green, blue values of the pixel (for an RGB image, for example). In their cell centers (i.e. in their cell nuclei) cells typically have color distributions that are known, so that a pixel that is a component of the cell nucleus may be easily determined on the basis of its color value.

Figure 5A:
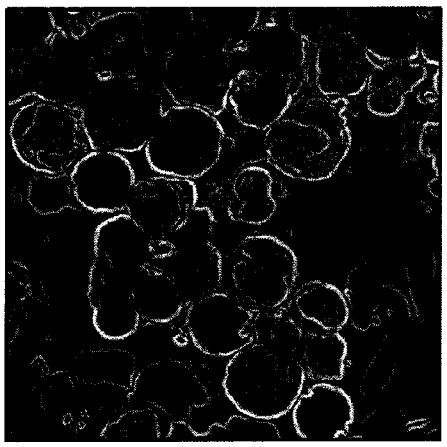
FIGS. 5a to 5e show intermediate images as may be formed when performing the steps of the flowchart shown in FIG. 4.
Figure 5B:
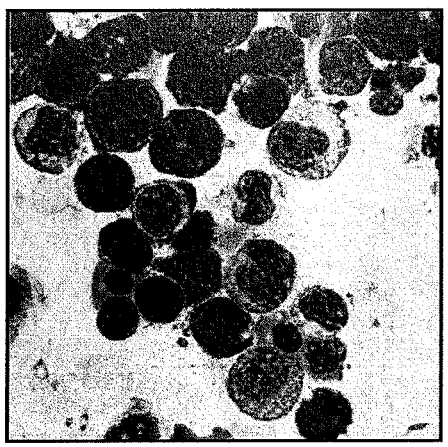

In accordance with some further embodiments, the further-processed version 203 of the original image 201 may be transformed into a gray-level image shown in FIG. 5b. Transformation of the further-processed version 203 of the original image 201 into the gray-level image shown in FIG. 5b may be performed, e.g., on the basis of the following formula $$I_{gbatan}(x, y) = \arctan\left(\frac{I_{green}(x, y)}{I_{blue}(x, y)}\right). \tag{1}$$

$I_{green}$ and $I_{blue}$ are the green and blue channels of the original image 201 and of the further-processed version 203 of same, respectively. (x,y) indicate the coordinates of a pixel within the original image 201 or within the further-processed version 203 of same.

The original image 201 or the further-processed version 203 of the original image 201 may be transformed into the gray-level image such that, for example, a likelihood (of a pixel) of belonging to the foreground continuously increases or decreases along a gray-level scale of the gray-level image.

The above formula (1) reveals that a gray level $I_{gbatan}(x,y)$ is determined for each pixel of the further-processed version 203 of the original image 201. To obtain background and/or foreground segmentation, a first threshold value may be determined on this gray-level image. Said first threshold value may be determined, for example, using the so-called Otsu method. An output of this threshold-value method are the pixels that are very likely to belong to the foreground of the original image 201 and/or of the further-processed version 203 of same and thus are very likely to belong to leukocytes. Pixels that are very likely to not belong to leukocytes may be pixels belonging to the background or belonging to artefacts. Consequently, a second threshold value may be formed on the basis of the pixels not are very likely to belong to the foreground (i.e. on the basis of all of the pixels except for the pixels that are very likely to belong to the foreground), so as to determine any pixels that are very likely to be located in the background (belong to the background). This may be performed, for example, in a sub-step 402 (of the step 204 of the method 200) of determining pixels that are very likely to be located in the background. Determination of the pixels that are that are very likely to be located in the background may be effected, for example, at a second stage of the Otsu method. In other words, the second threshold value may be determined by invoking the Otsu method once again; those pixels that are very likely to belong to the foreground of the original image 201 or of the further-processed version 203 of same have been removed from the calculation for the second threshold value. Even though in the flowchart shown in FIG. 4 the two sub-steps 401, 402 are not depicted to be directly mutually successive, the two sub-steps 401, 402 may be performed directly one after the other or even in a common step, in accordance with further embodiments.

In other words, the method 200 may comprise a step of determining pixels which are very likely to belong to a background of the picture (of the original image 201) and of determining pixels which are very likely to belong to a foreground of the picture (of the original image 201) while using a (two-stage) threshold-value method.

In addition, in accordance with embodiments of the present invention, the step of determining pixels which are very likely to belong to a background of the picture and of determining pixels which are very likely to belong to a foreground of the picture may comprise transforming the picture (the original image 201) or the further-processed version 203 of same into a gray-level image (described above) to determine, on the basis of a first threshold value, those pixels that are very likely to belong to the foreground, and to subsequently determine, on the basis of a second threshold value, from a quantity of pixels that are very likely to not belong to the foreground, those pixels that are very likely to belong to the background.

Figure 5C:
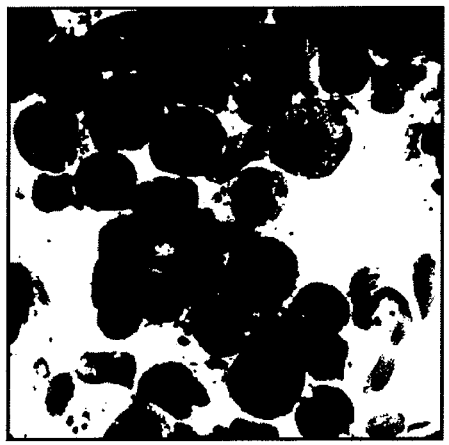

FIG. 5c shows the gray-level image of FIG. 5b following the determination of those pixels that are very likely to belong to leukocytes, and following the determination of those pixels that are very likely to be located in the background. The image in FIG. 5c thus shows coarse segmentation of foreground (depicted in black) and background (depicted in white).

On the basis of this segmentation, the foreground color of the closest leukocyte (with regard to the pixel) may be estimated for each pixel of the image (of the original image 201 or of the further-processed version 203 of same) in a sub-step 403 of estimating the foreground color for each pixel and/or of associating a cell estimation color value with each pixel (of the step 204 of the method 200) on the basis of this segmentation. The foreground color is estimated on the basis of those pixels which are very likely to belong to leukocytes and were determined by the above-mentioned threshold-value method. A foreground color of a leukocyte may also be referred to as a cell estimation color value or as a cell estimation sample.

A first cell estimation color value associated with a first pixel may be determined on the basis of a predefined minimum number of color values of pixels which are very likely to belong to a foreground of the picture and are located in an area around the first pixel. This is effected for each pixel, so that each pixel of the picture (of the original image 201) has precisely one cell estimation color value associated with it.

In other words, the foreground color of the closest leukocyte may be estimated, for each pixel of the image, in that in a window around each pixel (image point) the mean value (of the color values of the pixels in the window which are very likely to belong to the foreground) is calculated and the result is assigned to the pixel in the center (of the window) as the color estimation value. If the number of foreground pixels (image points that are very likely to belong to the foreground) that are available in the window falls below a specific threshold (a minimum number), the window size may be increased as long as sufficient pixels (image points that are very likely to belong to the foreground) are available. In this context, for example, a window may have a square, rectangular, round, hexagonal or any other shape. In other words, a cell estimation color value of a pixel may correspond to a central tendency of color values of pixels in a predetermined environment of the respective pixel which are very likely to belong to the foreground.

In accordance with further embodiments, the sub-step 403 of estimating the foreground color for each pixel may also be performed such that each pixel which is not very likely to belong to the foreground of the original image 201 has a cell estimation color value associated with it. In other words, it is not absolutely necessary that each pixel of the original image 201 has a new cell estimation color value associated with it. For example, a cell estimation color value of a pixel that is very likely to belong to the foreground and is thus located within a biological cell may be identical with its color value, since the pixel is obviously already part of the closest leukocyte.

Figure 5E:
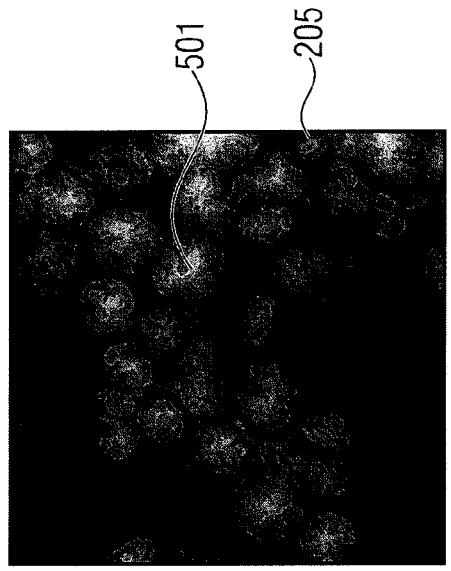
Figure 5D:
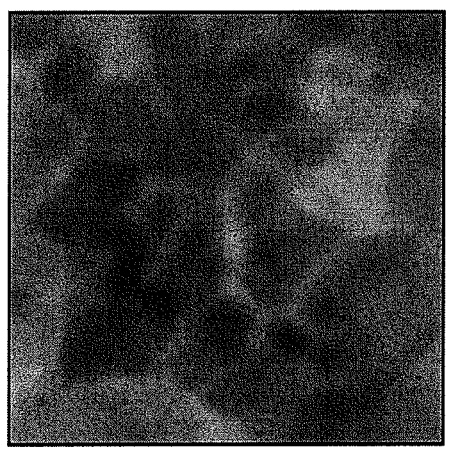

FIG. 5d shows a result of the sub-step 403 of estimating the foreground color for each pixel.

The step 204 of the method 200 further comprises a sub-step 404 of calculating an edge-strength image. Even though in the flowchart in FIG. 4 calculation of the edge-strength image is performed after the sub-step 403 of estimating the foreground color for each pixel, calculation of the edge-strength image may also be performed prior to said sub-step 403 and prior to the sub-step 401 of determining pixels that are very likely to belong to leukocytes, since the edge-strength image is created on the basis of the original image 201 or of the further processed version 203 of same. The edge-strength image may be created, for example, by high-pass filtering the original image 201 or the further-processed version 203 of same, so that only high frequencies present in the original image 201 or in the further-processed version 203 of same can pass these high-pass filters, and lower frequencies are filtered out. High frequencies typically occur at transitions with major color changes, such as is the case, for example, between the foreground and the background and/or between the cell and the background. Locations having high frequencies in the original image 201 or in the further-processed version 203 of same thus represent edges between cells and background. An output of the sub-step 404 is the edge-strength image represented in FIG. 5a. Edges are represented by bright areas here. Areas having no edge are shown to be dark. As may be seen from the edge-strength image in FIG. 5a, the sub-step 404 of determining and/or calculating the edge-strength image comprises assigning, to each pixel of the picture (of the original image 201) or of the further-processed version 203 of same, an edge-strength value which depends on a (color) gradient of a color curve of the original image 201 or of the further-processed version 203 of same at the respective pixel.

In the specific embodiment shown here, the edge-strength image may be calculated using an algorithm of Di Zenzo, as is shown in the document DI ZENZO, S.: *A note on the gradient of a multi-image*. Comput. Vision Graph. Image Process, 33(1): 116-125, 1986.

In addition, the step 204 of the method 200 comprises a sub-step 405 of applying a first fast marching algorithm. The sub-step 405 of applying the first fast marching algorithm may be the previously mentioned step 110 of the method 100, for example. As was already mentioned above, the step 204 of the method 200 serves to amplify the cells, so that they become more prominent. The first fast marching algorithm is used to achieve precisely this amplification. It is initialized with a quantity of pixels (image points) that are very likely to be located in the background. Said pixels or image points were determined in the sub-step 402 of the step 204 of the method 200. On the basis of color information and edge strengths, the propagation of a fast marching front of the first fast marching algorithm is influenced such that it initially passes through the entire background, then the foreground, and, lastly, the cell centers.

The previously mentioned color information is based on the cell estimation color values for each pixel which were determined in the sub-step 403. The edge strengths are based on the edge-strength image determined in the sub-step 404. The fast marching front of the first fast marching algorithm reaches pixels of the cells (the pixels which are very likely to belong to leukocytes and were determined in step 401) much later than those pixels that are very likely to be located in the background. This results in a high arrival time within the cells and in a low arrival time in the background. If said arrival times are interpreted as gray levels in an image (in the first fast marching image 205 as is depicted in FIG. 5e), the cells are very prominent and will then be easier to detect and to segment in the next step (in step 206 of the method 200).

In addition to requiring the initialization points (pixels that are very likely to be located in the background) from which the first fast marching algorithm starts and which may be calculated, as was described, by a two-stage OTSU method, for example, the first fast marching algorithm necessitates also a velocity function. The velocity function used in the specific embodiment shown here is indicated in the following formula (2):

$$F_{bg}(x, y) = \frac{D(x, y)^\alpha + \theta}{\gamma + I_{grad}(x, y)}. \quad (2)$$

$F_{bg}(x,y)$ indicates the velocity of the fast marching front of the first fast marching algorithm in a pixel having the coordinates (x, y). D(x,y) indicates the distance of the color value of the current pixel having the coordinates (x, y) from an estimation of the foreground color (of the cell estimation color value calculated in the sub-step 403 for each pixel). $I_{grad}$ is i the edge-strength image calculated in the specific embodiment with the aid of the algorithm of Di Zenzo from the original image 201 or the further-processed version 203 of same. $I_{grad}(x,y)$ indicates an edge-strength value of the current pixel. α and θ are parameters that influence how both components (the distance D(x,y) and the edge-strength value $I_{grad}(x,y)$) of the formula are weighted. γ is an additional parameter which prevents that the denominator of the velocity function becomes zero, and in the specific embodiment may have the value of 0.00001.

As was already mentioned above, FIG. 5e shows the output of the first fast marching algorithm in the form of the first fast marching image 205. Dark areas characterize areas having a low arrival time of the fast marching front of the first fast marching algorithm, and bright areas characterize areas having a high arrival time of the fast marching front of the first fast marching algorithm. It becomes clear that cell nuclei 501 are represented to be brightest, since they have a highest arrival time. This becomes apparent from formula (2) for the velocity function of the first fast marching algorithm, since a distance D(x,y) of a pixel located in a cell nucleus 501 from its cell estimation color value (estimated foreground color of the closest leukocyte) is typically small and may even become zero, whereby the numerator of the formula (2) for the velocity function of the first fast marching algorithm is determined only by means of θ, and whereby the velocity function in this area is thus slower than in areas wherein a distance D(x,y) between a color value of pixel and its associated cell estimation color value is large.

In addition, pixels located in cell nuclei 501 are separated by an edge from the background, i.e. from the initialization points, of the first fast marching algorithm. Therefore, to reach a pixel located in a cell nucleus 501 of a leukocytes, the fast marching front may first get past an edge between the foreground and the background. However, this fast marching front moves slowly in the area of the edges due to the edge-strength image in the denominator of the formula (2) for the velocity function. As a result, the time of arrival of the fast marching front at the pixels located in cell nuclei 501 increases even more. By applying the first fast marching algorithm on the basis of this color information and edge strengths, one achieves that the individual cells are more prominent than is the case in the original image 201 (as is shown in FIG. 3a) or in the further-processed version 203 of same (as is shown in FIG. 3b).

The first fast marching image 205 serves as an input for the third step 206 of the method 200 of detecting the cell midpoints (cell centers that may be located in cell nuclei 501) and of segmenting the background.

Figure 6:
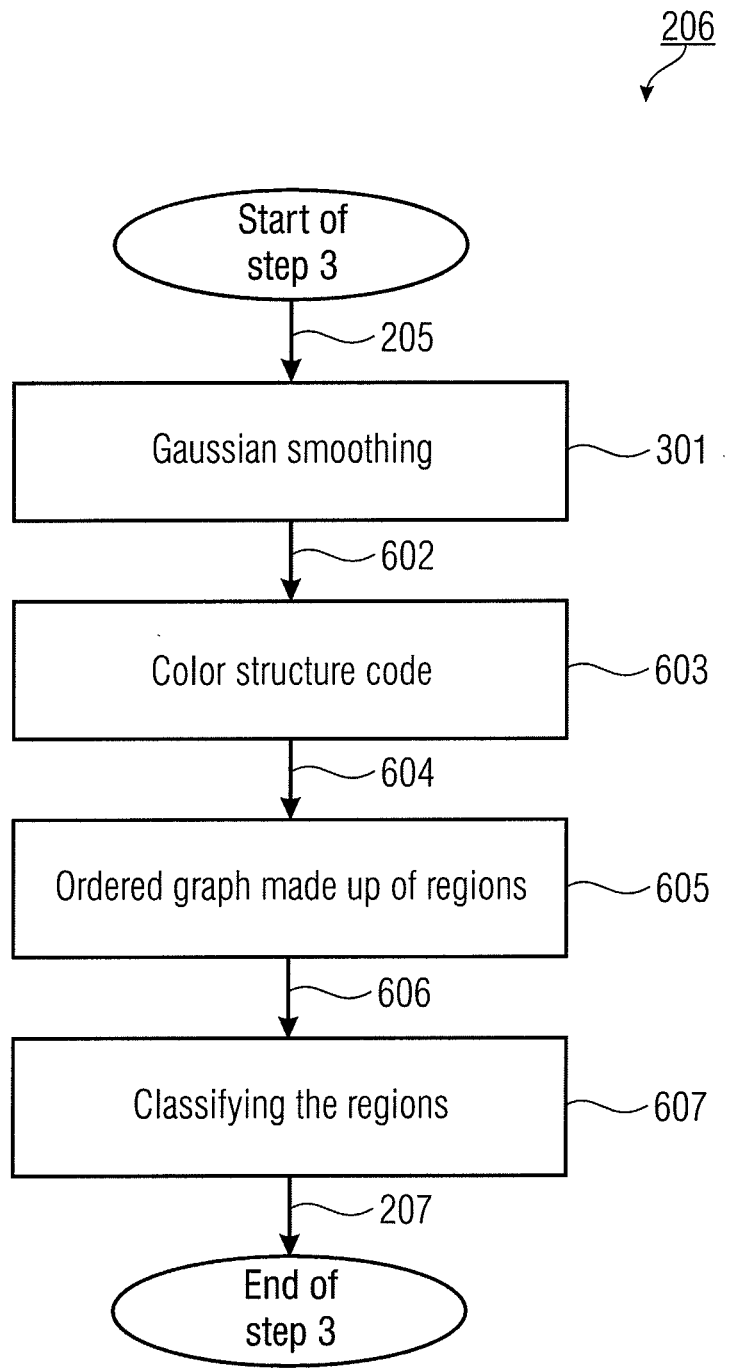
FIG. 6 shows a flowchart which depicts a subdivision of a third step of the method of FIG. 2 into sub-steps.

In the specific embodiment of the method 200, detection and segmentation of leukocytes is performed in several steps, which are depicted as sub-steps of the step 206 in a flowchart in FIG. 6.

A sub-step 601 of Gaussian smoothing of the step 206 of the method 200 comprises—in order to balance out any artefacts resulting from the previous step (the step 204)—heavily smoothing the output of the first fast marching algorithm (the first fast marching image 205). From a spectral point of view, Gaussian smoothing of the first fast marching image 205 is low-pass filtering of the first fast marching image 205. In accordance with further embodiments, the first fast marching image 205 may also be smoothened using a different low-pass function.

Figure 7A:
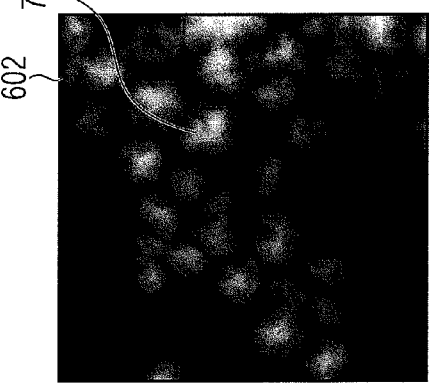
FIGS. 7a to 7f show intermediate images as may be formed when performing the steps of the flowchart of FIG. 6.
Figure 7B:
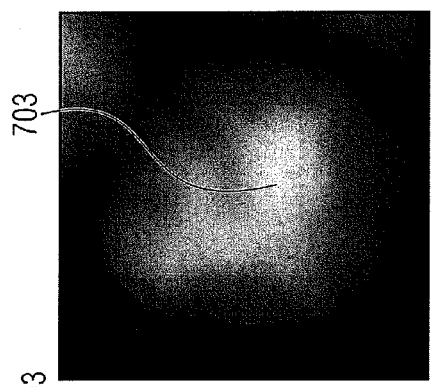

An output of the step 601 of Gaussian smoothing is depicted as a smoothened fast marching output 602 in FIG. 7a. FIG. 7b shows a magnification of a cell 703 from the smoothened fast marching output 602. One may see from FIGS. 7a and 7b that cell nuclei of the leukocytes are represented by bright color regions, and that the brightness of the leukocytes decreases toward the edge (toward the cytoplasm). The background is depicted as a dark area in FIGS. 7a and 7b.

A further sub-step 603 of segmenting the smoothened fast marching output 602 into a plurality of homogeneous regions (of the step 206 of the method 200) comprises segmenting the smoothened fast marching output 602 into homogeneous regions. In the specific embodiment of the method 200, the sub-step 603 comprises applying the so-called color structure code algorithm, which is shown in the document PRIESE, L. and P. STURM: *Introduction to the Color Structure Code and it Implementation*, 2003, to the smoothened fast marching output 602. Said color structure code algorithm serves to identify the homogeneous regions. The sub-step 603 (of the step 206 of the method 200) may be, e.g., the step 120 of segmenting the first fast marching image or the further-processed version of same into a plurality of homogeneous regions. The further-processed version of the first fast marching image is the smoothened fast marching output 602. As the output of the sub-step 603, one will obtain a list 604 of homogeneous regions found.

Since the background of the first fast marching image 205 and of the smoothened fast marching output 602 is a dark area with homogeneous coloration, the major part of the background may be represented by a single homogeneous region. The cells (the leukocytes) themselves may be represented by many small regions in each case, which are arranged like concentric circles (starting from a cell midpoint). Since biological cells are typically not present in an optimally circular shape, the homogeneous regions may also be present in other concentric shapes, homogeneous regions having higher (brighter) color values (e.g. cell midpoints) typically being surrounded by homogeneous regions having lower (darker) color values (e.g. homogeneous regions representing cytoplasm).

Figure 7C:
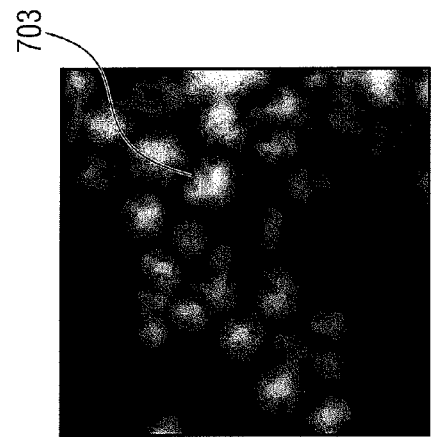
Figure 7D:
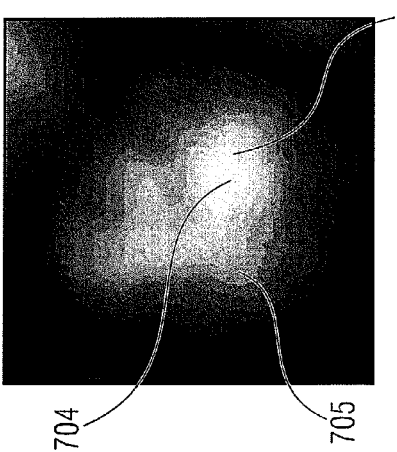

The arrangement of the homogeneous regions may be seen in FIGS. 7c and 7d as an output of the color structure code. FIG. 7d shows a close-up of the cell 703 of FIG. 7b. It becomes clear that the cell 703 has been segmented into a plurality of homogeneous regions extending outward from a cell nucleus 704 of the cell 703. Typically, the cell nucleus 704 of the cell 703 is represented by a smaller number of homogeneous regions than a cytoplasm 705 of the cell 703. In addition, it becomes clear that a homogeneous region which is located in the cell nucleus 704 of the cell 703 has a brighter (a higher) color value than a homogeneous region located in the cytoplasm 705 of the cell 703. A homogeneous region located in the background typically has an even lower (darker) color value than do homogeneous regions located in cytoplasms of cells.

The color structure code method serves to identify homogeneous regions in an image. In this context, the pixels of the input image are supposed to be arranged in a hexagonal grid structure. Since the pixels of the input image are normally arranged in a Cartesian manner, a mapping from the Cartesian grid to the hexagonal grid is defined. This hexagonal grid structure is then recursively subdivided into small groups, which will be called islands from now on. At the lowest level, seven pixels are combined into one island of the level 0 in each case. This includes the pixel located at the center of the hexagon and its seven directly adjacent pixels. All islands of the level 0, in turn, form the same hexagonal structure and may be combined into islands of the level 1 just like at the lowest level. This is repeated recursively until one gets to the topmost level, which consists of only one island.

The color structure code method consists of three phases. The initialization phase, the linking phase and the dividing phase. The initialization phase comprises verifying the pixels of each island of the level 0 as to their similarity, and grouping pixels that have sufficient similarity into so-called code elements. The linking phase comprises generating the code elements of the next island up in that the code elements of the level underneath are combined if they are sufficiently similar. This is repeated for all hierarchy levels, resulting in several trees of code elements. The dividing step is performed whenever two adjacent code elements are not to be combined due to their dissimilarity, but are already connected to one another via common code elements of lower levels. Subsequently, the code elements underneath are distributed to the two code elements. Once the method has arrived at the highest level, several trees consisting of code elements of different hierarchy levels will have been generated. Each tree now represents a homogeneous region.

The similarity measure used is a threshold value that is compared to the difference of two intensity values. If the difference is smaller, both code elements are considered to be similar.

In order to correctly select the free parameter of the color structure code, a number of homogeneous regions that are to be achieved using this algorithm is specified in advance. With the aid of the bisection method and of several color structure code runs, this free parameter is then determined such that the desired number of homogeneous regions is at least approximated.

In accordance with some embodiments, pixels of the first fast marching image 205 or of a further-processed version of same (of the smoothened fast marching output 602) are therefore combined into a common homogeneous region on the basis of color values of the pixels and of a neighborhood relationship of the pixels. In other words, segmenting 603 of the first fast marching image 205 or of a further-processed version of same (of the smoothened fast marching output 602) comprises combining, in a hierarchical manner, pixel clusters of pixels of the first fast marching image 205 or of the further-processed version of same which are mutually adjacent and have a similar color value.

Observing the neighborhood relationship of the pixels is relevant so that mutually spaced-apart cell components of different cells are not combined into a common homogeneous region.

A color value of a homogeneous region may be a mean color value of all of the pixels of the homogeneous region, for example.

The step 206 of the method 200 further comprises a sub-step 605. The sub-step 605 of mapping each of the homogeneous regions to one node, respectively, of a graph so that nodes of adjacent homogeneous regions are connected to one another and so that the graph has roots which correspond to homogeneous regions located at cell centers, has, as the input, the list 604 of homogeneous regions as was determined by the sub-step 603 (the step 206 of the method 200). The sub-step 605 may be the step 130 of the method 100, for example. An output of the sub-step 605 is an ordered graph 606 of homogeneous regions. Each node of the graph 606 represents one homogeneous region. Two nodes are connected to each other when the associated homogeneous regions are adjacent. The mean value (the mean color value) of each homogeneous region indicates the order of the homogeneous region within the graph 606. That is, brighter homogeneous regions (e.g. regions located in cell midpoints or cell centers) are higher up in the graph and have a higher order, darker homogeneous regions (e.g. homogeneous regions located in the background) are located further down and have a lower order.

Figure 8A:
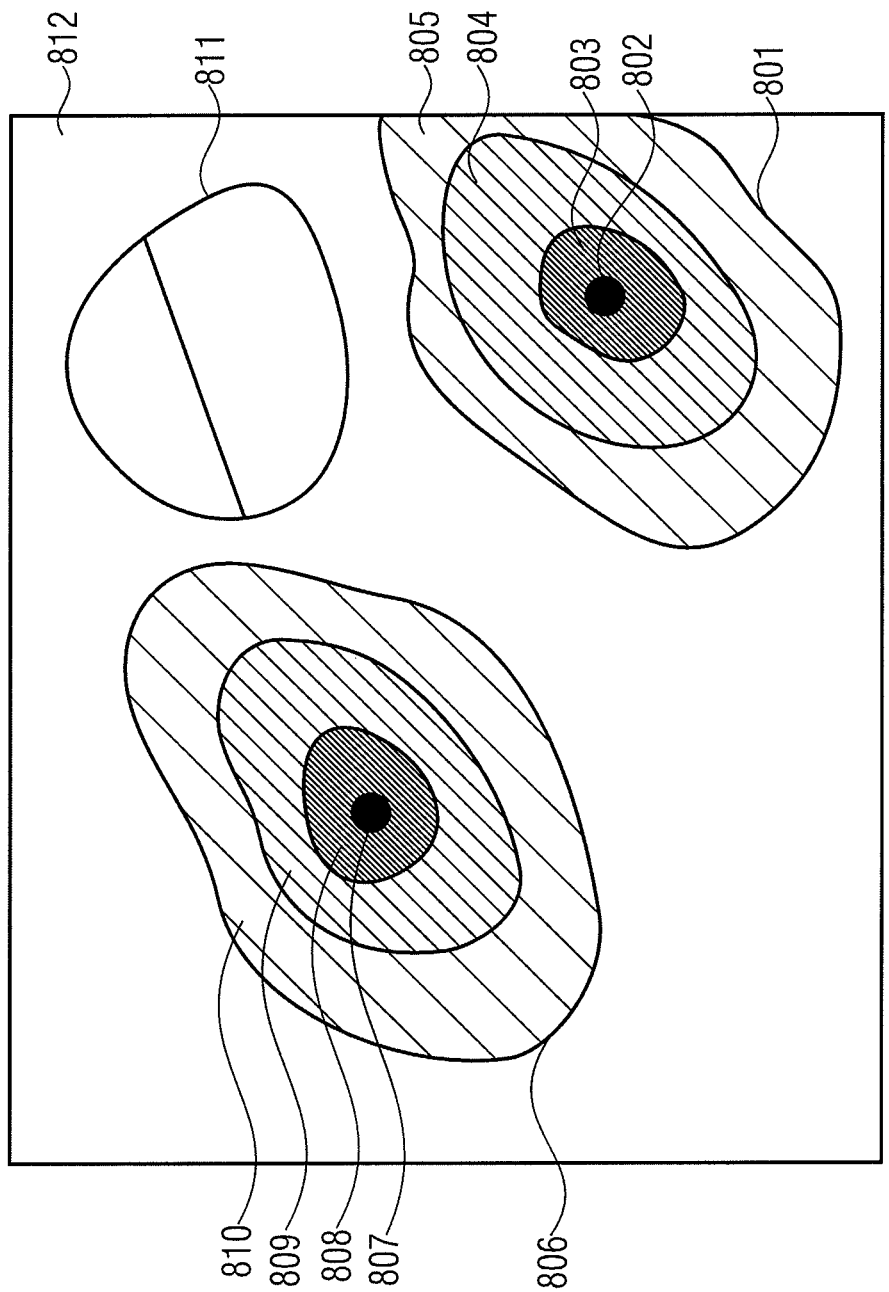
FIG. 8a shows an exemplary image comprising a plurality of homogeneous regions.
Figure 8B:
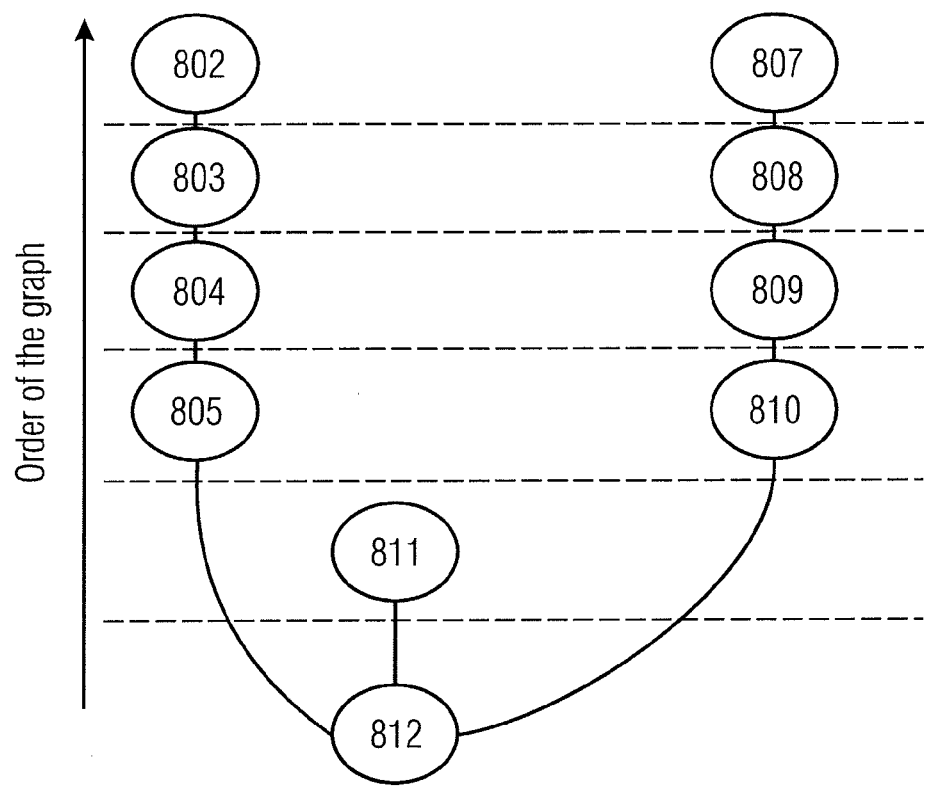
FIG. 8b shows a graph wherein the regions of FIG. 8a are mapped to nodes of the graph.

The association of homogeneous regions of cells with the graph 606 shall now be explained by way of example by means of FIGS. 8a and 8b. FIG. 8a shows a picture (e.g. a sub-area of the image shown in FIG. 7c) comprising several cells and several homogeneous regions. A density of a hatching of a homogeneous region represents the color value of the respective homogeneous region, a high color value representing a bright homogeneous region and a low color value representing a dark homogeneous region (e.g. background).

A first cell 801 in the picture 800 comprises a first homogeneous region 802 located at a cell center (e.g. in a cell nucleus) of the first cell 801. The first homogeneous region 802 is surrounded by a second homogeneous region 803, which may still belong to the cell nucleus of the first cell, but may also already be part of the cytoplasm of the first cell 801. A third homogeneous region 804 surrounds the second homogeneous region 803. A fourth region 805 surrounds the third region 804. It becomes clear that the density of the hatchings of the homogeneous regions 802-805 decreases in the outward direction with regard to the first cell 801, i.e. the color values of the regions 802-805 decrease in the outward direction.

By analogy with the first cell 801, the same applies to a second cell 806, which comprises a fifth homogeneous region 807 located at a cell center (e.g. in a cell nucleus) of the second cell 806. The fifth homogeneous region 807 is surrounded by a sixth homogeneous region 808, which may still be part of the cell nucleus of the second cell 806, but may also be part of a cytoplasm of the second cell 806. The sixth homogeneous region 808 is surrounded by a seventh homogeneous region 809, and said homogeneous region 809 is surrounded by an eighth homogeneous region 810. For the second cell 806, too, the density of the hatchings of the homogeneous regions 807-810 decreases in the outward direction with regard to the second cell 806. A ninth homogeneous region 811 has an even lower color value than the homogeneous regions 805 and 810. A tenth homogeneous region 812 has a lowest color value of the homogeneous regions of the picture 800. Therefore, the tenth homogeneous region 812 may be referred to as the background of the picture 800.

FIG. 8b shows the partitioning of the homogeneous regions of FIG. 8a within a graph, wherein each homogeneous region is mapped to precisely one node, and wherein nodes of adjacent homogeneous regions are connected to one other. It becomes clear that the first region 802, which is located at the cell center of the first cell 801, and the fifth homogeneous region 807 located at the cell center of the second cell 806 are roots of the graph in FIG. 8b. In addition, the ninth homogeneous region 811 is a root of the graph. A leaf of the graph is the tenth homogeneous region 812. An arrangement of the regions within the graph may be effected, as was already mentioned above, on the basis of the mean color values of the homogeneous regions. This becomes clear, in the graph in FIG. 8b, in that even though forming a root of the graph, the ninth homogeneous region 811 is arranged lower down in the order of the graph than are the homogeneous regions 802 and 807.

Even though in the example shown here several homogeneous regions have the same order within the graph and thus have the same mean color value, in further embodiments each homogeneous region may have a mean color value of its own, and the graph may thus have an order which corresponds to the number of homogeneous regions.

In a further sub-step 607 (of the step 206 of the method 200), the homogeneous regions obtained may now be classified. In this step 607 of classifying the regions, a decision is made as to which homogeneous regions make up the cell midpoints and, in addition, a decision is made as to which regions belong to the background and to the foreground, respectively. The sub-step 607 of the step 206 of the method 200 may be the step 140 of the method 100, for example. To obtain features for the classification of the homogeneous regions, the ordered graph 606 was built from homogeneous regions in the sub-step 605.

Relevant features for the classification may be the following:

$f_1$: In an ascending manner, the shortest path to the closest root.
$f_2$: In a descending manner, the shortest path to the closest leaf.
$f_3$: In an ascending manner, the longest path to the closest root.
$f_4$: In a descending manner, the longest path to the closest leaf.
$f_5$: In an ascending manner, the longest path from any leaf to any root through the current node.
$f_6$: Number of reachable roots by means of ascent.
$f_7$: Color value of the current region compared, in terms of percentage, to the maximum and minimum color values in the image.

In this application, a length of a path is determined to be the number of edges of the graph 606 that are located between a starting node of the path and a terminal node of the path. One edge interconnects exactly two nodes. A length of a path thus is also the number of intermediate nodes located along the path from the starting node to the terminal node, plus one.

The classification into foreground and background may be determined by means of several features. If one of said features is satisfied, this region will be background. In this context, $Thr_x$ is a fixed threshold value of the corresponding feature in each case. Features classifying a region as background shall be cited below.

A first feature is $f_7 < Thr_1$, which means that a color value of the current region is smaller than a first predefined value $Thr_1$, and that this region consequently is classified as background, since regions having very low color values are background. With regard to the example of FIG. 8b, for example, the homogeneous region 811 might be classified as background due to its low color value.

A second criterion is $f_2 = 0$, which means that a homogeneous region belonging to this node is a leaf of the graph. The leaves of the graph are background since leaves are local minima, and consequently, the homogeneous region will also be classified as background.

A third criterion is $f_5 < Thr_2$, which means that if a length of a longest path, in an ascending direction with regard to the order of the graph 606, from a leaf of the graph 606 to a root of the graph 606 through a node to which the homogeneous region is mapped is smaller than a second predefined value $Thr_2$, this homogeneous region will be classified as background. Or, in other words, if the longest path from a leaf to a root through this region is too short, the region will be classified as background. In this manner, regions that have developed on account of artefacts, such as, e.g., dirt in the picture (in the original image 201), will be filtered out. This third criterion also filters out any regions that are mapped to roots of the graph 606, wherein the path to a leaf is too short and which therefore cannot be a cell center.

A fourth criterion is $f_7 < Thr_3$ and $f_2 < Thr_4$ and $f_6 > 1$, which means that if a color value of the respective homogeneous region is smaller than a third predefined value $Thr_3$, a length of a shortest path, in a direction that is descending in terms of the order of the graph 606, from the node to which the homogeneous region is mapped to a closest leaf (with regard to the current node) of the graph 606 is smaller than a fourth predefined value $Thr_4$, and if more than one root of the graph 606 may be reached, starting from the current node, in the ascending direction, said homogeneous region will be classified as background. In other words, this fourth criterion classifies as background such regions of which several roots may be reached and which have a relatively low color value. In the specific embodiment presented here, the fourth predefined value $Thr_4$ may have the value 3. This $4^{th}$ criterion is useful for separating cells from one another, when burst cells or erythrocytes (red blood corpuscles) exist between other cells and thus render separation difficult.

Any regions that were classified as background are combined and yield the final background segmentation. The remaining regions are foreground.

A region is the center of a leukocyte (or of a cell) if it is a root of the graph 606 (met by the criterion $f_1 = 0$) and if it was classified as foreground rather than as background on the basis of the above-mentioned classification (for example if the third criterion is not met).

Figure 7E:
Figure 7F:
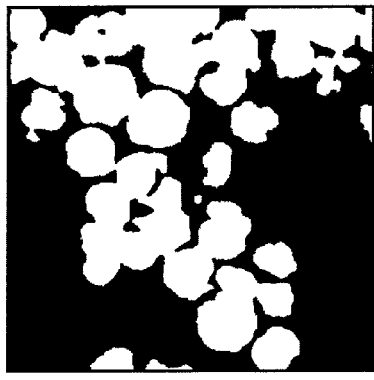

Thus, an output of the step 207 are cell midpoints or cell centers (which are roots of the graph and are classified as foreground) and a segmentation into foreground and background. FIG. 7e shows the cell midpoints (depicted to be white), and FIG. 7f shows the segmentation into foreground and background, the foreground being depicted to be white and the background depicted to be black.

The output 207 of the sub-step 607 of the step 206 of the method 200 and, thus, the output 207 of the step 206 of the method 200 serve as the foundation for the fourth step 208 of the method 200 of separating the individual cells (as is shown in the flowchart in FIG. 2). The fourth step 208 of the method 200 may be the step 150 of the method 100, for example.

This step 208 of the method 200 comprises separation on the basis of the previously calculated cell midpoints (or cell centers) and the segmentation into background and foreground (i.e. on the basis of the output 207 of the step 206 of the method 200). This separation of the cells is realized with the aid of a second fast marching algorithm. The cell midpoints calculated (shown in FIG. 7e) are used as the initial front of the second fast marching algorithm. In other words, the second fast marching algorithm starts from the homogeneous regions located at cell centers which correspond to the roots of the graph 606.

A velocity function of the second fast marching algorithm has the following form:

$$F(x, y) = \begin{cases} 0, & \text{for } (x, y) \notin ROI_{fg} \\ \dfrac{1}{\varepsilon + I_{grad}(x, y)}, & \text{for } (x, y) \in ROI_{fg}. \end{cases} \quad (3)$$

$ROI_{fg}$ is the foreground segmentation from the previous step (from step 206). Just like in the step 204, $I_{grad}$ is an edge-strength image and may be, e.g., the same edge-strength image as the edge-strength image from step 204. Just like in the velocity function of the first fast marching algorithm, $\varepsilon$ is a parameter which prevents the denominator of the velocity function from becoming zero. One may see from the formula (3) for the velocity function of the second fast marching algorithm that the velocity function of the second fast marching algorithm adopts the value zero for homogeneous regions classified as background; i.e. not only does the second fast marching algorithm start in the foreground, but the fronts of the second fast marching algorithm end at the boundaries between foreground and background.

The second fast marching algorithm may have as many fronts as there are cell midpoints (cell centers), i.e. a separate fast marching front starts from each cell midpoint. By modifying this second fast marching algorithm, one may achieve that—if two fronts starting from different cell midpoints or cell centers meet—said meeting points will be used as separating lines between the cells, whereby unambiguous segmentation of the cells is enabled. In other words, a meeting line between a first fast marching front, which starts from a first cell center of a first biological cell, and a second fast marching front, which starts from a second cell center of a second biological cell, forms a boundary between the first biological cell and the second biological cell.

The second fast marching image 209 generated by the second fast marching algorithm may be a final output image of the method 200 and provide a list of foreground regions, (at least approximately) each foreground region describing precisely one cell.

Figure 9B:
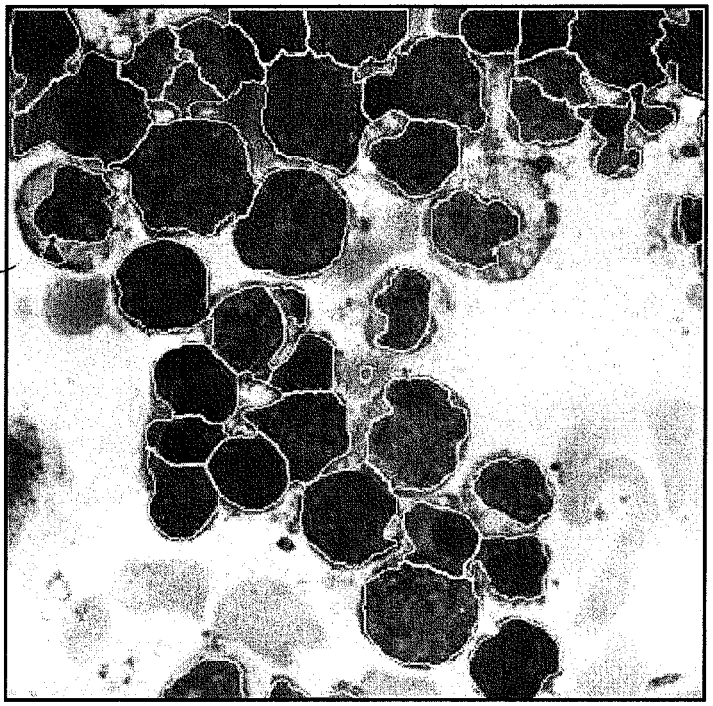
FIG. 9b shows an output image of the method of the flowchart in FIG. 2 while using the image of FIG. 9a as the input image for the method.
Figure 9A:
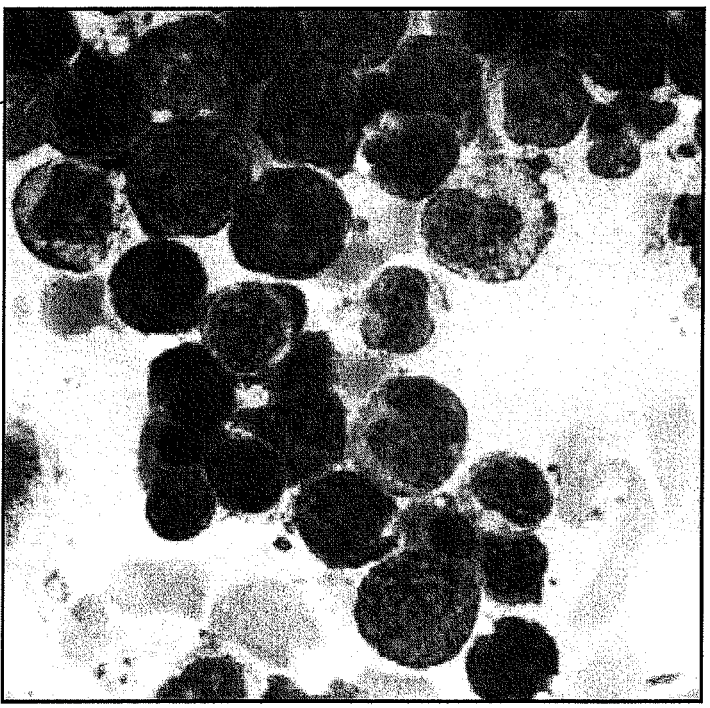

FIG. 9a once again shows the original image 201 (the input image or the picture) of the method 200, and FIG. 9b shows the final output image (the second fast marching image 209) of the method 200. In the image in FIG. 9b, one may clearly see that the individual cells have been segmented from one another (divided from one another). In particular, one may see that no (or only minor) over-segmentation of the cells has formed.

Figure 10:
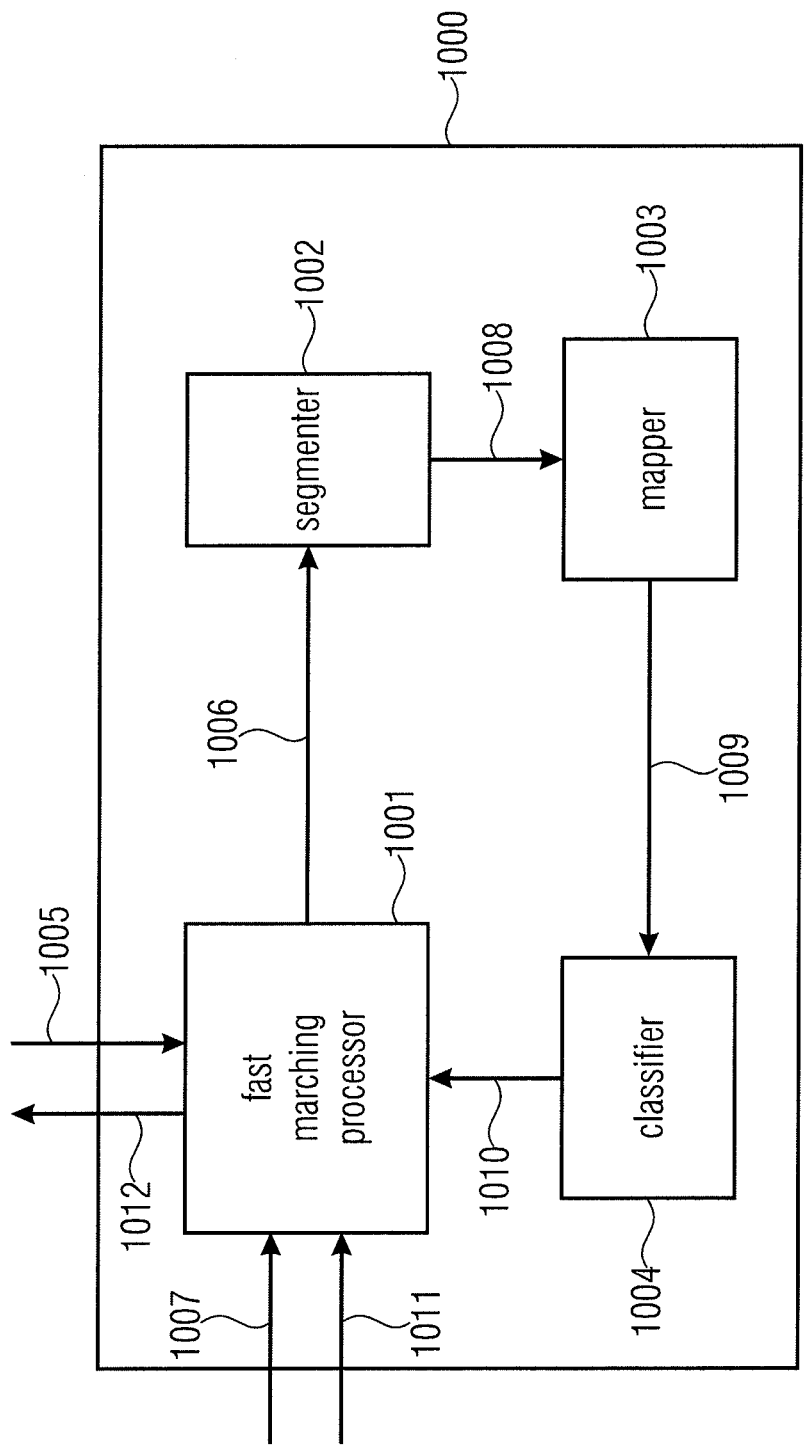
FIG. 10 shows a block diagram of an apparatus in accordance with an embodiment of the present invention.

FIG. 10 shows a block diagram of an apparatus 1000 for segmenting biological cells in a picture, so that the biological cells represent a foreground of the picture. The apparatus 1000 further comprises a fast marching processor 1001, a segmenter 1002, a mapper 1003, and a classifier 1004. The fast marching processor 1001 is configured to apply a first fast marching algorithm to a picture 1005 or a pre-processed version of same so as to obtain a first fast marching image 1006, the first fast marching algorithm starting from a background of the picture 1005, and a velocity function of the first fast marching algorithm being based on a first edge-strength image 1007 of the picture 1005.

The segmenter 1002 is configured to segment the first fast marching image 1006 or a further-processed version of same into a plurality 1008 of homogeneous regions.

The mapper 1003 is configured to map each of the homogeneous regions to one node, respectively, of a graph 1009 so that nodes of adjacent homogeneous regions are interconnected and that the graph 1009 comprises roots which correspond to homogeneous regions located at cell centers.

The classifier 1004 is configured to classify each homogeneous region either as background or as foreground on the basis of the graph 1009. One output of the classifier 1004 may be foreground and background segmentation 1010, for example.

The fast marching processor 1001 is further configured to apply a second fast marching algorithm within the homogeneous regions classified as foreground to a second edge-strength image 1011 so as to segment the foreground into individual biological cells 1012, said second fast marching algorithm starting from those homogeneous regions that correspond to the roots of the graph.

In accordance with some embodiments, the fast marching processor 1001 may also comprise two separate computing units, a first computing unit of the fast marching processor 1001 applying the first fast marching algorithm, and a second computing unit of the fast marching processor 1001 applying the second fast marching algorithm.

The apparatus 1000, the fast marching processor 1001, the segmenter 1002, the mapper 1003, and the classifier 1004 may be independent hardware units or parts of a processor of a computer or microcontroller or digital signal processor, or may be realized as computer programs or computer program products for execution on a computer or microcontroller or digital signal processor.

Figure 11:
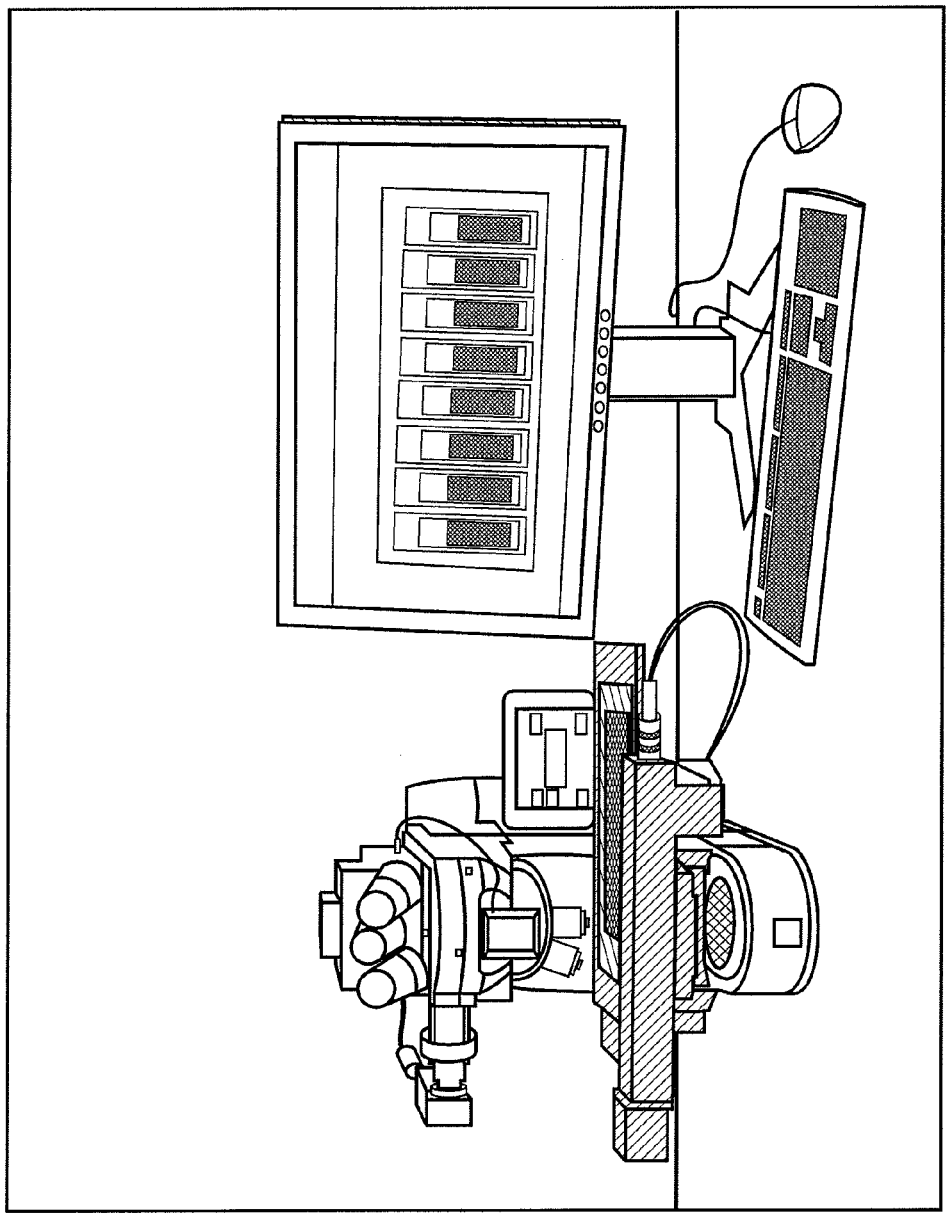
FIG. 11 shows an image of a CAM system.

As was already mentioned above, a typical CAM system (shown in FIG. 11) consists of the core modules of detecting the cells, segmenting the cells, and classifying the cells. Embodiments of the present invention address the first two modules of such a CAM system, detection and segmentation of the cells. A method (the method 200) was presented, by way of example of bone marrow smears, said method addressing the problem, in particular, that the white blood cells are present in cell clusters and that exact differentiation is rendered difficult as a result. Since for implementing an automated approach (based on a CAM system), exact segmentation represents a crucial step for final classification, a concept was presented which realizes as exact a segmentation as possible of white blood cells also on images of bone marrow smears.

Embodiments of the present invention describe a method of segmenting leukocytes in microscopic pictures by way of example of bone marrow smears. In contrast to known methods (as were set forth in the introductory part of this application), the following problems are solved by the approach presented here: robust detection of the different cell types, robust segmentation of the different cell types, or robust segmentation of the different cell types in cell clusters.

Segmentation of leukocytes, which was described in connection with the method 200, is an important component of a CAM system mentioned above. It represents the initial step of such a system, wherein the individual cell is initially to be detected and, subsequently, to be segmented with as much precision as possible. Exact segmentation has a crucial effect in particular on the subsequent step, the classification of the cell. The individual steps of the method 200 of segmenting leukocytes were explained in more detail by way of example of pictures of bone marrow smears, and the course of the method 200 was shown by means of the flowchart in FIG. 2. Embodiments of the present invention (i.e., for example, the method 200) expect, as an input, an image containing one or more leukocyte clusters. Common picture formats are, e.g., RGB images having a depth of 8 bits per channel (per color channel) and pixel. It has been found that a 100-fold magnification is a fair compromise between the number of mapped cells in a picture and a sufficient degree of detail so as to be able to recognize the boundaries between two cells. One aim of embodiments of the present invention is to localize and segment any leukocytes present. The output of embodiments of the present invention is a collection of regions, each region ideally corresponding to precisely one leukocyte.

Embodiments of the present invention thus enable robust detection and segmentation of leukocytes in bone marrow smears. In contrast to known methods (as were described, for example, in the introductory part of this application), over-segmentation is minimal. Embodiments of the present invention will still provide good results even if the images are soiled by burst cells, dirt and other artefacts that occasionally result from taking the samples. In addition, variations in the illumination or the background color may be compensated for, and will not or only minimally disturb detection and segmentation.

Even though some aspects were described in connection with an apparatus, it is understood that said aspects also represent a description of the corresponding method, so that a block or a component of an apparatus is also to be understood as a corresponding method step or as a feature of a method step. By analogy therewith, aspects that were described in connection with or as a method step also represent a description of a corresponding block or detail or feature of a corresponding apparatus. Some or all of the method steps may be performed by a hardware apparatus (or while using a hardware apparatus) such as a microprocessor, a programmable computer or an electronic circuit. In some embodiments, some or several of the most important method steps may be performed by such an apparatus.

Depending on specific implementation requirements, embodiments of the invention may be implemented in hardware or in software. Implementation may be performed using a digital storage medium, for example a floppy disc, a DVD, a Blu-ray disc, a CD, a ROM, a PROM, an EPROM, an EEPROM, or a flash memory, a hard disc or any other magnetic or optical memory which has electronically readable control signals stored thereon that may cooperate, or indeed do cooperate, with a programmable computer system such that the respective method is performed. This is why the digital storage medium may be computer-readable.

Some embodiments in accordance with the invention thus include a data carrier having electronically readable control signals that are capable of cooperating with a programmable computer system such that any of the methods described herein is performed.

Generally, embodiments of the present invention may be implemented as a computer program product having a program code, the program code being operative to perform any of the methods when the computer program product runs on a computer.

The program code may also be stored on a machine-readable carrier, for example.

Other embodiments include the computer program for performing any of the methods described herein, the computer program being stored on a machine-readable carrier.

In other words, an embodiment of the inventive method thus is a computer program having a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of data may be configured, e.g., to be transferred via a data communication link, for example via the interne.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (e.g. a field-programmable gate array, an FPGA) may be used for performing some or all of the functionalities of the methods described herein. In some embodiments, a field-programmable gate array may cooperate with a microprocessor to perform any of the methods described herein. In some embodiments, the methods are generally performed by any hardware device. The latter may be a universally employable hardware such as a computer processor (CPU) or a hardware specific to the method, such as an ASIC, for example.

The above-described embodiments merely represent an illustration of the principles of the present invention. It is to be understood that modifications and variations of the arrangements and details described herein will be appreciated by other persons skilled in the art. This is why it is intended that the invention be limited only by the scope of the following claims rather than by the specific details that were presented herein by means of the description and the explanation of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method of segmenting biological cells in a picture, so that the biological cells represent a foreground of the picture, the method comprising:
    applying a first fast marching algorithm to the picture or to a pre-processed version of same so as to achieve a first fast marching image, the first fast marching algorithm starting from a background of the picture, and a velocity function of the first fast marching algorithm being based on a first edge-strength image of the picture;
    segmenting the first fast marching image or a further-processed version of same into a plurality of homogeneous regions;
    mapping each of the homogeneous regions to one node, respectively, of a graph so that nodes of adjacent homogeneous regions are connected to one another and so that the graph comprises roots which correspond to homogeneous regions located at cell centers;
    classifying, on the basis of the graph, each homogeneous region either as background or as foreground; and
    applying a second fast marching algorithm within the homogeneous regions classified as foreground to a second edge-strength image so as to segment the foreground into individual biological cells, the second fast marching algorithm starting from those homogeneous regions which correspond to the roots of the graph.

2. The method as claimed in claim 1, wherein in the application of the first fast marching algorithm, the velocity function of the first fast marching algorithm is further based on a distance function indicating, for each pixel of the picture, a distance of a color value of the respective pixel from a cell estimation color value associated with the respective pixel.

3. The method as claimed in claim 1, further comprising determining, by means of a color threshold-value method, pixels of the picture which are very likely to belong to the foreground of the picture; and further comprising associating a cell estimation color value corresponding to a central tendency of samples of pixels in a predetermined environment of the respective pixel, which are very likely to belong to the foreground, with each pixel that is not very likely to belong to the foreground of the picture.

4. The method as claimed in claim 1, further comprising determining pixels that are very likely to belong to a foreground of the picture, and of determining pixels that are very likely to belong to a background of the picture while using a threshold-value method; and wherein in the application of the first fast marching algorithm, the first fast marching algorithm starts from the pixels of the picture which are very likely to be located in the background of the picture.

5. The method as claimed in claim 4, wherein during determining pixels that are very likely to belong to a foreground of the picture and/or pixels that are very likely to belong to a background of the picture, the picture or a further-processed version of same is transformed to a gray-level image such that a likelihood of belonging to the foreground continuously increases or decreases along a gray-level scale of the gray-level image so as to determine, on the basis of the first threshold value of the threshold-value method, those pixels that are very likely to belong to the foreground and to subsequently determine, on the basis of a second threshold value of the threshold-value method, from a quantity of pixels that are very likely to not belong to the foreground, those pixels that are very likely to belong to the background.

6. The method as claimed in claim 1, further comprising determining the edge-strength image, wherein each pixel of the picture has assigned to it an edge-strength value which depends on a gradient of a color curve of the picture or of the further-processed version of same at the respective pixel.

7. The method as claimed in claim 1, wherein the velocity function of the first fast marching algorithm is calculated for a pixel in accordance with $$F_{bg}(x, y) = \frac{D(x, y)^\alpha + \theta}{\gamma + I_{grad}(x, y)},$$

wherein (x,y) indicates a coordinate position of the pixel within the picture, $F_{bg}(x,y)$ indicates a velocity of the first fast marching algorithm in the pixel, $D(x,y)$ indicates a distance of a color value of the pixel from a cell estimation color value associated with the pixel, $I_{grad}(x,y)$ indicates an edge-strength value of the pixel, and $\alpha$, $\theta$, $\gamma$ are predetermined constants.

8. The method as claimed in claim 1, wherein segmenting of the first fast marching image or of the further-processed version of same comprises combining, in a hierarchical manner, pixel clusters of pixels of the first fast marching image or of the further-processed version of same which are mutually adjacent and comprise a similar color value.

9. The method as claimed in claim 1, wherein in the mapping of the homogeneous regions to one node, respectively, of the graph, an order of a homogeneous region within the graph is based on a sample of the homogeneous region, a sample of a homogeneous region being a mean value of samples of pixels associated with the homogeneous region.

10. The method as claimed in claim 1, wherein a homogeneous region is located at a cell center if a node to which the homogeneous region is mapped is a root of the graph; and if the homogeneous region was classified as foreground during classification.

11. The method as claimed in claim 1, wherein during classifying, a homogeneous region is classified as background, if a sample of the homogeneous region is smaller than a first predefined value; or if a node to which the homogeneous region is mapped forms a leaf of the graph; or if a length of a longest path, in an ascending direction with regard to the order of the graph, from a leaf of the graph to a root of the graph through the node to which the homogeneous region is mapped is smaller than a second predefined value; or if the color value of the homogeneous region is smaller than a third predefined value, a length of a shortest path, in a direction that is descending in terms of the order of the graph, from the node to which the homogeneous region is mapped to a closest leaf of the graph is smaller than a fourth predefined value, and if more than one root of the graph may be reached, starting from the node to which the homogeneous region is mapped, in the ascending direction.

12. The method as claimed in claim 1, wherein a velocity function of the second fast marching algorithm adopts the value zero for any homogeneous regions classified as background.

13. The method as claimed in claim 1, wherein the second fast marching algorithm is configured such that a meeting line between a first fast marching front, which starts from a first cell center of a first biological cell, and a second fast marching front, which starts from a second cell center of a second biological cell, forms a boundary between the first biological cell and the second biological cell.

14. The method as claimed in claim 1, wherein the first edge-strength image is identical with the second edge-strength image.

15. An apparatus for segmenting biological cells in a picture, so that the biological cells represent a foreground of the picture, the apparatus comprising:

a fast marching processor configured to apply a first fast marching algorithm to a picture or a pre-processed version of same so as to achieve a first fast marching image, the first fast marching algorithm starting from a background of the picture, and a velocity function of the first fast marching algorithm being based on a first edge-strength image of the picture;

a segmenter configured to segment the first fast marching image or a further-processed version of same into a plurality of homogeneous regions;

a mapper configured to map each of the homogeneous regions to one node, respectively, of a graph so that nodes of adjacent homogeneous regions are interconnected and that the graph comprises roots which correspond to homogeneous regions located at cell centers; and a classifier configured to classify each homogeneous region either as background or as foreground on the basis of the graph;

said fast marching processor being further configured to apply a second fast marching algorithm within the homogeneous regions classified as foreground to a second edge-strength image so as to segment the foreground into individual biological cells, said fast marching processor being configured such that said second fast marching algorithm starts from those homogeneous regions that correspond to the roots of the graph.

16. A non-transitory computer-readable medium having stored thereon a computer program comprising a program code for performing the method of segmenting biological cells in a picture, so that the biological cells represent a foreground of the picture, the method comprising:

applying a first fast marching algorithm to the picture or to a pre-processed version of same so as to achieve a first fast marching image, the first fast marching algorithm starting from a background of the picture, and a velocity function of the first fast marching algorithm being based on a first edge-strength image of the picture;

segmenting the first fast marching image or a further-processed version of same into a plurality of homogeneous regions;

mapping each of the homogeneous regions to one node, respectively, of a graph so that nodes of adjacent homogeneous regions are connected to one another and so that the graph comprises roots which correspond to homogeneous regions located at cell centers;

classifying, on the basis of the graph, each homogeneous region either as background or as foreground; and applying a second fast marching algorithm within the homogeneous regions classified as foreground to a second edge-strength image so as to segment the foreground into individual biological cells, the second fast marching algorithm starting from those homogeneous regions which correspond to the roots of the graph, when the program runs on a computer.

* * * * *